(12) United States Patent
Bowers et al.

(10) Patent No.: US 10,019,766 B2
(45) Date of Patent: Jul. 10, 2018

(54) METHOD, MEDIUM, AND SYSTEM FOR ENABLING GIFT CARD TRANSACTIONS

(71) Applicant: Facebook, Inc., Menlo Park, CA (US)

(72) Inventors: Neville Bowers, Menlo Park, CA (US); Ramkumar Vaidyantathan, Menlo Park, CA (US); Soham Mazumdar, Menlo Park, CA (US); Patrick Linarducci, Menlo Park, CA (US); Lee Linden, Menlo Park, CA (US); Ted Zagat, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 1002 days.

(21) Appl. No.: 13/835,269

(22) Filed: Mar. 15, 2013

(65) Prior Publication Data
US 2014/0214626 A1    Jul. 31, 2014

Related U.S. Application Data

(60) Provisional application No. 61/849,813, filed on Jan. 31, 2013.

(51) Int. Cl.
*G06Q 30/00* (2012.01)
*G06Q 50/00* (2012.01)
(Continued)

(52) U.S. Cl.
CPC .......... *G06Q 50/01* (2013.01); *G06Q 30/0635* (2013.01); *B42D 25/285* (2014.10); *G06Q 20/342* (2013.01); *G06Q 30/02* (2013.01)

(58) Field of Classification Search
CPC .. G06Q 30/02; G06Q 20/342; G06Q 30/0635; G06Q 50/01
(Continued)

(56) References Cited

U.S. PATENT DOCUMENTS 6,321,211 B1  11/2001  Dodd
7,117,168 B2  10/2006  Eaton
(Continued)

OTHER PUBLICATIONS

Dec. 28, 2011—https://www.americanbanker.com/news/startup-aims-to-let-shoppers-use-gift-cards-at-multiple-merchants.*
(Continued)

*Primary Examiner* — Matthew E Zimmerman
(74) *Attorney, Agent, or Firm* — Keller Jolley Preece

(57) ABSTRACT

One variation of the first method includes: receiving a first gift order from a first sender through a social networking system, the first gift order specifying a recipient, a first merchant, and a first monetary value redeemable through the first merchant; issuing a tangible gift card to the recipient, the gift card linked to a gift account, of the recipient, within the social networking system; receiving a second gift order from a second sender through the social networking system, the second gift order specifying the recipient, a second merchant, and a second monetary value redeemable through the second merchant; linking the first and second monetary values to the gift account; and, in response to a first purchase from the first merchant with the gift card, publishing a detail of the first purchase to a feed within the social networking system in accordance with a privacy setting of the recipient.

22 Claims, 12 Drawing Sheets

(51) Int. Cl.
*G06Q 30/06* (2012.01)
*G06Q 20/34* (2012.01)
*B42D 25/20* (2014.01)
*G06Q 30/02* (2012.01)

(58) Field of Classification Search
USPC .............................................. 705/26.1, 27.1
See application file for complete search history.

(56) References Cited

U.S. PATENT DOCUMENTS

| | | | |
|---|---|---|---|
| 7,174,307 | B2 | 2/2007 | Sakai et al. |
| 7,792,751 | B2 | 9/2010 | Tan |
| 7,895,085 | B2 | 2/2011 | Karas et al. |
| 8,046,266 | B1 | 10/2011 | Geller et al. |
| 8,571,983 | B1 | 10/2013 | Blackhurst et al. |
| 2002/0026377 | A1 | 2/2002 | Takahashi |
| 2008/0040673 | A1* | 2/2008 | Zuckerberg ....... G06F 17/30867 715/745 |
| 2008/0048023 | A1 | 2/2008 | Russell et al. |
| 2009/0192928 | A1* | 7/2009 | Abifaker ................ G06Q 30/02 705/35 |
| 2010/0010918 | A1* | 1/2010 | Hunt .................... G06Q 20/102 705/26.1 |
| 2010/0280911 | A1* | 11/2010 | Roberts ................ G06Q 20/202 705/21 |
| 2010/0280921 | A1 | 11/2010 | Stone et al. |
| 2010/0312724 | A1 | 12/2010 | Pinckney et al. |
| 2010/0324985 | A1 | 12/2010 | Kumar et al. |
| 2011/0016014 | A1 | 1/2011 | Tonnison et al. |
| 2011/0022424 | A1 | 1/2011 | Vonderheide |
| 2011/0106698 | A1* | 5/2011 | Isaacson .............. G06Q 20/105 705/41 |
| 2011/0131107 | A1* | 6/2011 | Hurst ................... G06Q 20/045 705/26.1 |
| 2011/0264528 | A1 | 10/2011 | Whale |
| 2011/0282942 | A1* | 11/2011 | Berger .................. G06Q 50/01 709/204 |
| 2011/0307478 | A1 | 12/2011 | Pinckney et al. |
| 2012/0016817 | A1 | 1/2012 | Smith et al. |
| 2012/0022930 | A1 | 1/2012 | Brouhard |
| 2012/0031545 | A1* | 2/2012 | Vaccaro .................... G09F 1/00 156/153 |
| 2012/0150600 | A1 | 6/2012 | Isaacson et al. |
| 2012/0150605 | A1 | 6/2012 | Isaacson et al. |
| 2012/0191513 | A1* | 7/2012 | Ocher ................ G06Q 30/0207 705/14.1 |
| 2012/0234911 | A1* | 9/2012 | Yankovich ............. G06Q 30/06 235/379 |
| 2012/0245987 | A1* | 9/2012 | Isaacson ................ G06Q 30/06 705/14.23 |
| 2012/0245990 | A1 | 9/2012 | Agarwal |
| 2013/0080321 | A1* | 3/2013 | Mulhall ................ G06Q 30/06 705/41 |
| 2013/0081073 | A1 | 3/2013 | Kang et al. |
| 2013/0317926 | A1* | 11/2013 | Leeds .................. G06Q 20/342 705/21 |
| 2014/0076966 | A1* | 3/2014 | Blackhurst ............. G06Q 20/34 235/380 |
| 2014/0081852 | A1 | 3/2014 | Blackhurst et al. |
| 2015/0106263 | A1 | 4/2015 | Linden et al. |

OTHER PUBLICATIONS

U.S. Appl. No. 14/051,406, mailed Jun. 30, 2015, Office Action.
U.S. Appl. No. 14/051,406, mailed Feb. 16, 2016, Office Action.
U.S. Appl. No. 14/051,406, mailed Oct. 5, 2016, Office Action.
U.S. Appl. No. 14/051,406, dated May 22, 2017, Office Action.

\* cited by examiner

METHOD, MEDIUM, AND SYSTEM FOR ENABLING GIFT CARD TRANSACTIONS

CROSS-REFERENCE TO RELATED APPLICATIONS

This application claims the benefit of U.S. Provisional Patent Application No. 61/849,813, filed 31 Jan. 2013, the entirety of which is incorporated by reference herein. This application is related to: U.S. patent application Ser. No. 13/684,084, filed on 21 Nov. 2012 and titled "Method for Notifying a Sender of a Gifting Event"; U.S. patent application Ser. No. 13/684,089, filed on 21 Nov. 2012 and titled "Method for Recommending a Gift to a Sender"; U.S. patent application Ser. No. 13/615,289, filed on 13 Sep. 2012 and titled "Method for Enabling a Gift Transaction"; U.S. patent application Ser. No. 12/978,265, filed on 23 Dec. 2010 and titled "Contextually Relevant Affinity Prediction in a Social Networking System"; U.S. patent application Ser. No. 13/239,340, filed on 21 Sep. 2011 and titled "Structured Objects and Actions on a Social Networking System"; U.S. patent application Ser. No. 12/508,521, filed on 23 Jul. 2009 and titled "Markup Language for Incorporating Social Networking Information by an External Website"; U.S. Pat. No. 8,250,145, issued on 21 Aug. 2012 and titled "Personalizing a Web Page Outside of a Social Networking System with Content from the Social Networking System"; U.S. patent application Ser. No. 12/969,368, filed on 15 Dec. 2010 and titled "Comment Plug-In for Third Party System"; and U.S. patent application Ser. No. 13/167,702, filed on 24 Jun. 2011 and titled "Suggesting Tags in Status Messages Based On Social Context", all of which are incorporated in their entirety by this reference.

TECHNICAL FIELD

This invention relates generally to the field of e-commerce, and more specifically to a new and useful method for enabling gift card transactions in the field of e-commerce.

BACKGROUND

Gift cards account for millions of dollars in gift transactions and millions of dollars in liability for merchants annually. Monetary value is typically associated with these gift cards through stored value accounts that are accessible only through the physical gift cards themselves. Unfortunately, these cards are commonly lost, are forgotten, or otherwise fail to be applied to purchases by their recipients, and the monetary value of these cards thus remains inaccessible to their would-be owners. Furthermore, gift cards are often applicable to only a single brand or merchant, thereby requiring a recipient to carry various gift cards and then sift through the various gift cards in order to complete a transaction.

DESCRIPTION OF THE EMBODIMENTS

The following description of the embodiments of the invention is not intended to limit the invention to these embodiments, but rather to enable any person skilled in the art to make and use this invention.

1. First Method

Figure 1:
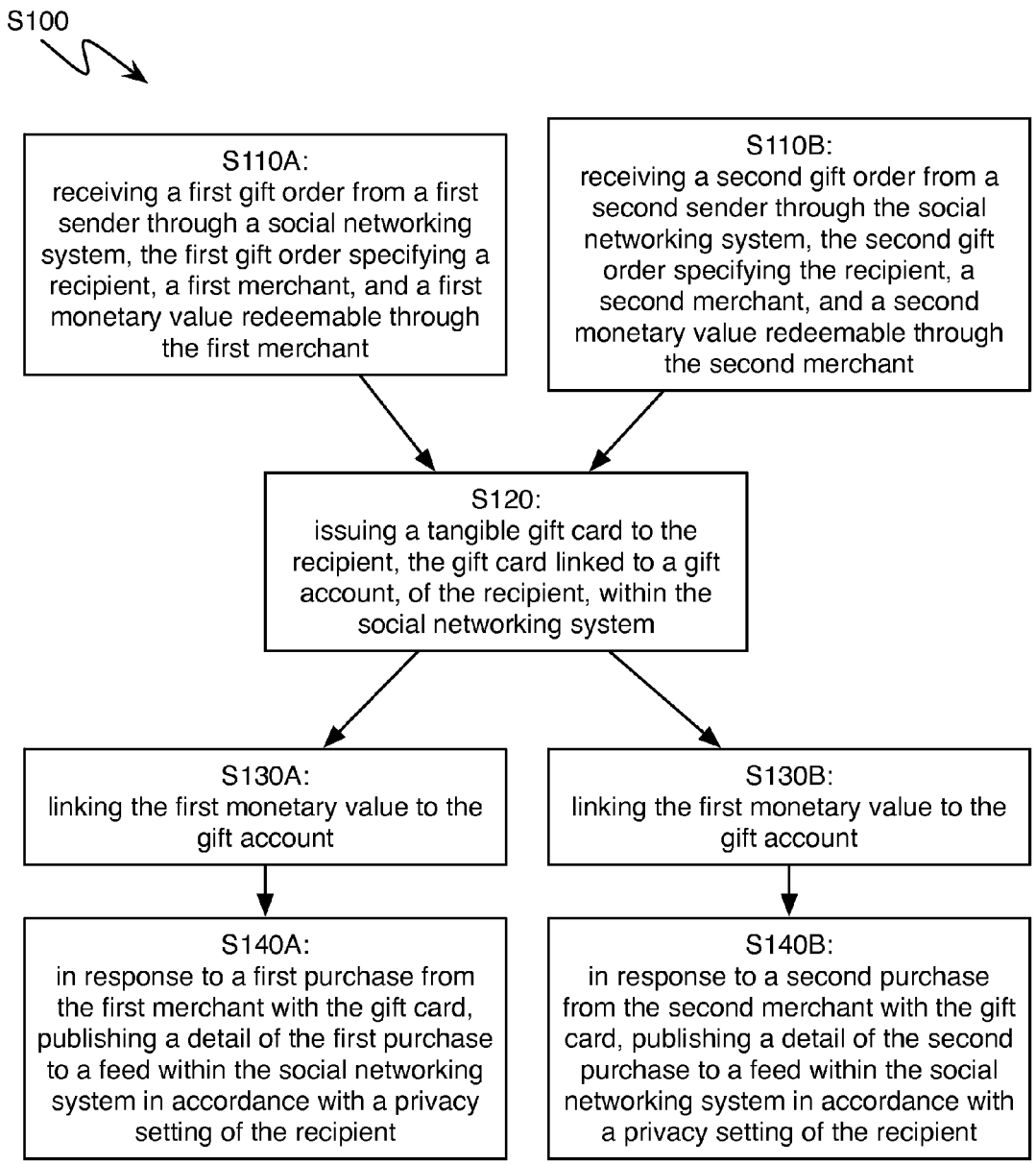
FIG. 1 is a flowchart representation of a first method of an embodiment.

As shown in FIG. 1, a first method S100 for enabling gift card transactions includes: receiving a first gift order from a first sender through a social networking system in Block S110A, the first gift order specifying a recipient, a first merchant, and a first monetary value redeemable through the first merchant; issuing a tangible gift card to the recipient in Block S120, the gift card linked to a gift account, of the recipient, within the social networking system; linking the first monetary value to the gift account in Block S130A; receiving a second gift order from a second sender through the social networking system in Block S110B, the second gift order specifying the recipient, a second merchant, and a second monetary value redeemable through the second merchant; linking the second monetary value to the gift account in Block S130B; in response to a first purchase from the first merchant with the gift card, publishing a detail of the first purchase to a feed within the social networking system in accordance with a privacy setting of the recipient in Block S140A; and in response to a second purchase from the second merchant with the gift card, publishing a detail of the second purchase to a feed within the social networking system in accordance with a privacy setting of the recipient in Block S140B.

Figure 9:
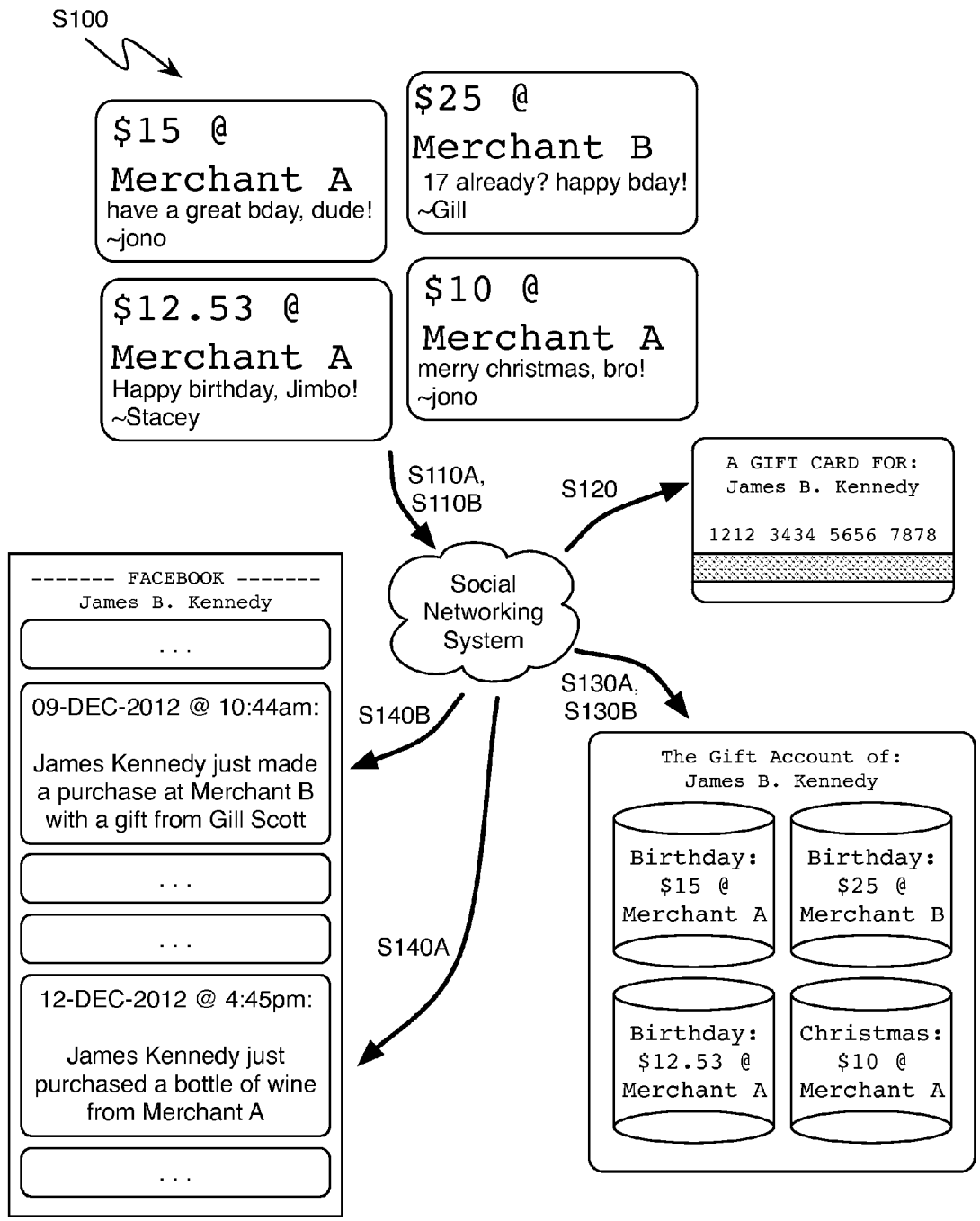
FIG. 9 is a flowchart representation of a variation of the first method.

As shown in FIG. 9, the first method S100 functions to collect multiple money-based gift orders, to link the gift orders to one recipient account with a social networking system, to provide a tangible gift card linked to the multiple gift orders through the gift account, and to post details of transactions made with the gift card to one or more feeds within the social networking system. By enabling multiple senders to submit gift orders, to a recipient, through the social networking system, the first method S100 can aggregate multiple gift orders for a single recipient into one account linked to one gift card, thus eliminating the need for the recipient to carry multiple gift cards. For example, method S100 can enable one sender to send one or more gifts to the recipient and/or can enable each sender in a set of multiple senders to send one or more gifts, and method S100 can maintain balance information and control application of a segregated balance for each gift fund in the recipient's account. The first method S100 can thus implement the one gift card as a singular redemption path for all monetary gifts sent to the recipient through the social networking system, such as over several days, weeks, months, or even years. The method can further enable a recipient to apply monetary gifts loaded to the gift card through the social networking system to purchases from various merchants, such as merchants specified in each gift order. Each merchant can be any of a brand, local boutique, local retailer location, a local franchise, a local market, an online retailer, or any other suitable retail or wholesale good or service provider carrying one or more products from one or more brands with one or more brick and mortar locations and/or online marketplaces.

The first method S100 can be implemented by a computer system, such as a gifting platform within a social networking system that receives gift orders from senders, issues gift cards to recipient, links gifts to the gift cards via gift accounts of the recipients, and posts purchase details to feeds within the social networking system. The computer system can be a cloud-based computer (e.g., Amazon EC3), a mainframe computer system, a grid-computer system, or any other suitable computer system. The computer system can support a messaging platform for communicating messages and/or gifts between the recipient, the sender, and/or other users. For example, the computer system can receive, distribute, and store gift orders submitted via a distributed network, such as over the Internet, and one or more processors throughout the distributed network can implement one or more Blocks of the first method S100. The computer system can also incorporate a sender-side interface and a recipient-side interface. The sender-side interface can incorporate a gift recommendation field, a gift selection field, a gift detail input field, a textual note input field, a payment field, a link to complete a gift order for the recipient, etc. The recipient may review the completed note, review a gift order, view a gift or gift card balance, request a new gift card, etc. through the recipient-side interface. Generally, the sender- and recipient-side interfaces can each be accessible through a web browser or through a native application executing on an computing device, such as a laptop computer, a desktop computer, a tablet, a smartphone, a personal data assistant (PDA), a personal music player, etc. and can be either internal or external the social networking system.

The first method S100 can be implemented through a social networking system (e.g., Facebook) that enables gifting between users, such as between senders and recipients. The social networking system can also contain relevant user, sender, and/or recipient information (e.g., relationship statuses, demographic information, interests), track dates and/or occurrences of gift-appropriate events (e.g., birthdays, promotions, graduations, anniversaries), and/or track tangible and/or virtual gifts sent to the recipient by other users, such as according to privacy settings set by the sender, recipient, and/or users. For example, the social networking system can implement the first method S100 in conjunction with a gifting function described in U.S. patent application Ser. No. 13/684,084, filed on 21 Nov. 2012, and/or U.S. patent application Ser. No. 13/684,089, filed on 21 Nov. 2012.

Additionally or alternatively, the first method S100 can be implemented by an online dating network, a single-merchant online marketplace, an online merchant aggregator, or any other suitable online or brick-and-mortar venue that enables remote exchange of goods and/or services. However, the first method S100 can be implemented by any other computer system, service, or network and can include any other interface to support collection and aggregation of monetary gifts from multiple senders into one gift account linked to one gift card issued to one recipient.

Block S110A of the first method S100 recites receiving a first gift order from a first sender through a social networking system, the first gift order specifying a recipient, a first merchant, and a first monetary value redeemable through the first merchant. Similarly, Block S110B of the first method S100 recites receiving a second gift order from a second sender through the social networking system, the second gift order specifying the recipient, a second merchant, and a second monetary value redeemable through the second merchant. Generally, Blocks S110A and S110B function to receive a gift order from various senders, such as through sender interfaces within the social networking system. For each gift order, the respective sender can specify the recipient, the monetary value, and the merchant such that the gift order can function as a gift card with a specified initial value redeemable at the specified merchant by the specified recipient.

Block S110B can receive the second gift order from the second sender at any time during or after Block S110A receives the first gift order from the first sender. In one example implementation, Blocks S110A and S110B receive the first and second gift orders substantially simultaneously. In another example implementation, Block S110B receives the second gift order after Block S110A receives the first gift order and before application of the first gift order to a transaction between the recipient and the first merchant. In the forgoing example implementations, a gift account of the recipient can include complete monetary values specified in the gift orders. In yet another example implementation, Block S110B receives the second gift order after application of a portion of the first gift order to a transaction between the recipient and the first merchant. In the forgoing example implementation, the gift account of the recipient can include a complete monetary value specified in the second gift order but only a portion of the monetary value specified in the first gift order. In a further example implementation, Block S110B receives the second gift order after application of the full value of the first gift order to a transaction between the recipient and the first merchant. In the forgoing example implementation, the gift account of the recipient can include the complete monetary value specified in the second gift order exclusive of the monetary value specified in the first gift order. For example, Block 110A can receive the first gift order from the first sender for the recipient's birthday in October, and Block S110B can receive the second gift order from the second sender for the recipient for the recipient's high school graduation in June, wherein the recipient spent the entirety of the first gift order prior to submission of the sender gift order. The method can therefore link one or more complete or partial gift orders to the gift account of the recipient at any given time.

The method can also include additional Blocks similar to Blocks S110A and S110B, wherein the additional Blocks include receiving additional gift orders from other senders through the social networking system, each gift order specifying the recipient, a merchant, and a monetary value redeemable through the specified merchant. The method can similarly include receiving multiple gift orders from a single sender over time, as shown in FIG. 9. For example, the first sender can submit the first gift order for the recipient's birthday in October, another gift order for the recipient for Christmas in December, and yet another gift order for the recipient's high school graduation in June. The method can also include receiving multiple gift orders specifying the same merchant. For example, Block S110A can receive the first gift order that specifies the first merchant, and the method can further receive a third gift order that also specifies the first merchant. In this example, the method can receive the third gift order prior to exhaustion of the monetary value of the first gift order such that the monetary value of the third gift order augments the first gift order. However, the method and Block S110A and S110B can receive any two or more gift orders from any two or more senders at any time or within any span of time, each gift order specifying the recipient, a monetary value, and a merchant.

Block S110A can receive the first gift order that includes selection of the first merchant from a set of participating merchants. Block S110B can similarly receive the second gift order that includes selection of the second merchant from the set of participating merchants. For example, the set of participating merchants can be a set of local merchants, such as the set includes a local coffee shop, a local fast food chain, a local high-end restaurant, a local mall, a local toy store, and a local department store. In another example, the set of participating merchants can include a set of online merchants specializing in particular types of products, such as a set of merchants with independent online clothing stores. Alternatively, Block S110A can receive the first gift order that specifies multiple merchants or that is not tied to a limited set of one or more merchants. However, Blocks S110A and S110B can receive selections of the first and second merchants from any other suitable set of participating merchants, respectively.

Blocks S110A and S110B can also receive further information related to gifts from senders, such as a note addressed to the recipient, a suggestion regarding use of the gift, or a condition on the gift. For example, the Block S110A can receive, from the first sender, a valid redemption period for the gift, a requirement to spend the gift with a particular person or on a particular type of product, or a particular location at which the gift is valid. However, Block S110A and S110B can receive any other relevant information from the first sender, the second sender, or any other sender.

When the first sender submits the first gift order, Block S110A can collect a first fund of the specified monetary value (and any applicable taxes and/or fees) from a financial account provided by the first sender. For example, Block S110A can withdraw (e.g., receive) the fund from credit card account, a debit card account, a checking account, or any other suitable financial account of or provided by the first sender. The fund can be of any suitable monetary value in any suitable currency, such as a dollar amount selected from predefined set (e.g., [$5, $10, $25, or $50) or a custom value (e.g., € 12,53) entered by the first sender. Block S110A can distribute the fund to a private account of the social networking system, to the first merchant prior to a transaction with the recipient, to a stored value account held by a bank or other financial service provider, or to any other suitable account or institution.

Alternatively, the method can withdraw the fund from the financial account specified by the first sender once the recipient approves the first gift order. For example, the method can notify the recipient of the gift order from the first sender and request approval of the first gift order from the recipient, as described in U.S. patent application Ser. No. 13/615,289, filed on 13 Sep. 2012. Similarly, the method can suggest that the recipient alter the first gift order, such as by selecting an alternative merchant, adjusting the first monetary value, or suggesting an alternative gift condition (e.g., type of product applicable to the first gift order). However, Block S110A can function in any other way to receive and handle the first gift order from the first sender through the social networking system. Block S110B can similarly function to receive and handle the second gift order from the second sender through the social networking system.

Block S120 of the first method S100 recites issuing a tangible gift card to the recipient, the gift card linked to a gift account, of the recipient, within the social networking system. Generally, Block S120 functions to assign a unique physical gift card to the recipient and to initiate delivery of the gift card to the recipient once the recipient receives his first monetary gift through the social networking system (e.g., the first gift order). For example, once Block S110A receives the first gift order and the recipient approves the first gift order, Block S120 can issue the gift card to the recipient such that the recipient can redeem the first monetary value of the first gift through a transaction at the first merchant with the gift card.

Block S120 can further link the gift card to the gift account of the recipient. The gift account can be accessible to the recipient through the social networking system, such as through the recipient-side interface (e.g., a profile of the recipient within the social networking system). By accessing the gift account, the recipient may review gift orders from one or more senders, view a gift or gift card balance, review past purchases made with monetary gifts through the gift card, request a new gift card, etc. The gift account can be accessible on any suitable computing device, such as a mobile computing device (e.g., smartphone, tablet) or a static computing device (e.g., desktop computer). The gift account can be supported within and/or maintained by the social networking system, and the gift account can be linked to the first and second monetary values stored in one or more financial accounts owned by, held by, or otherwise associated with the social networking system. Alternatively, the gift account can be linked to the first and second monetary values that are stored in one or more external financial accounts, such as one or more financial accounts held or owned by a bank, by the first merchant, and/or by the second merchant. In one example implementation, Block S120 links the gift card to the gift account by assigning the gift account a unique identification number of the gift card. However, Block S120 can link the gift card to the gift account supported and maintained in any other way and linked to the gift orders (e.g., monetary values of the gift orders) stored in any other financial account held by any other suitable entity.

Figure 5A:
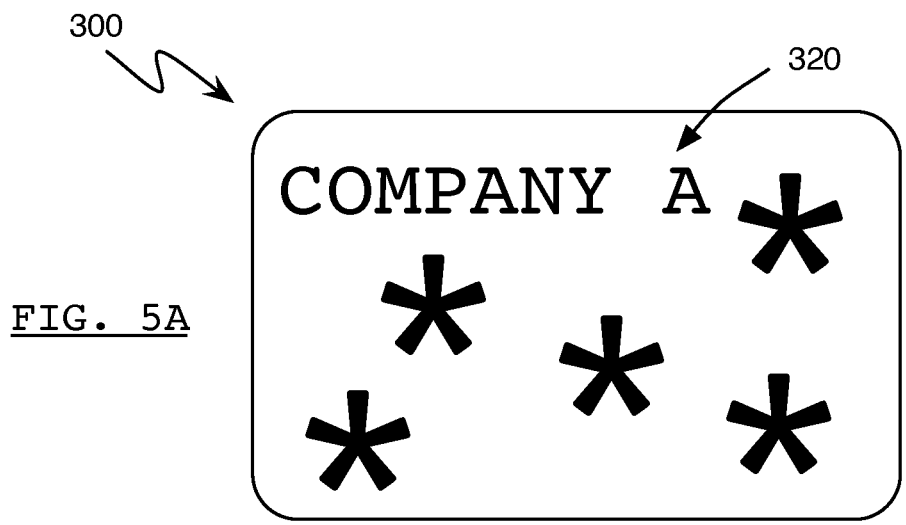
FIGS. 5A, 5B, and 5C are a schematic representations of a gift card.
Figure 5B:
Figure 5C:
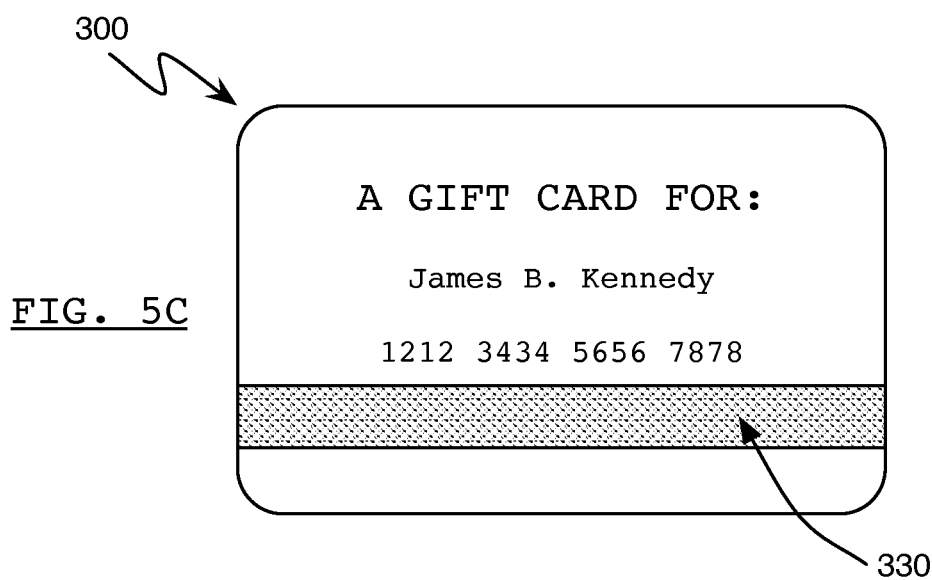

In one implementation shown in FIGS. 5A, 5B, and 5C, Block S120 issues a gift card 300 that includes: a polymer layer 310 (shown in FIG. 5B); a brand logo 320 arranged on a first side of the polymer layer 310 (shown in FIG. 5A); and a magnetic stripe 330 arranged on a second side of the polymer layer 310 opposite the brand logo 320 (shown in FIG. 5B), the magnetic stripe 330 configured to store data linked the gift account within a social networking system, the gift account associated with the recipient and a set of gifts, each gift in the set of gifts associated with a unique merchant and comprising a monetary value redeemable through a transaction with the unique merchant. For example, the set of gifts can include the first gift order and the second gift order. In this example implementation, the gift card 300 can be of a form factor and material substantially similar to that of a standard credit or debit card. The gift card 300 can also incorporate magnetic stripe technology commonly implemented in credit and debit cards such that the gift card can be processed through a magnetic stripe reader at a merchant in order to complete a transaction with the merchant. For example, when swiped along a magnetic stripe reader at the first merchant, the magnetic stripe 330 can enable application of the first monetary value, of the first gift in the set of gifts, to a purchase from the first merchant, and wherein, when swiped along a magnetic stripe reader at the second merchant, the gift card can enable application of the second monetary value, of the second gift in the set of gifts, to a purchase from the second merchant. The gift card 300 can also include a gift card number, such as a set of embossed digits (and a name of the recipient) arranged on one side of the polymer sheet 310 such that the recipient can use the gift card 300 for online purchases by entering the series of digits into an online checkout. Additionally or alternatively, the gift card 300 can include a bar code, a quick response (QR) code, a near-field communication (NFC) chip, a radio-frequency identification (RFID) chip, or any other suitable image-, contact-, or wireless-based infrastructure to identify the gift card 300, the recipient, and/or the gift account of the recipient.

In the foregoing example implementation, method S100 can include sending the gift card through a postal service. The gift card can therefore also be branded with a logo of the social networking system, as shown in FIG. 5A. For example, Block S120 can interface with a third-party manufacture and a third-party shipping service to manufacture the gift card unique to the recipient and to ship the gift card to the recipient, respectively. However, Block S120 can issue the gift card to the recipient in any suitable form.

Alternatively, Block S120 can issue the gift card in digital form. For example, Block S120 can issue a digital image of a gift card including a digital image of a bar code or a QR code such that a merchant may scan the gift card rendered on a display of a mobile computing device (e.g., smartphone) carried by the recipient. However, Block S120 can issue the gift card of any suitable form to the recipient in any suitable way.

Block S130A of the first method S100 recites linking the first monetary value to the gift account. Similarly, Block S130B of the first method S100 recites linking the second monetary value to the gift account. As described above, the funds of the first and second monetary values of the first and second gift orders can be stored in financial accounts held by the social networking system, a bank, the first merchant, the second merchant, and/or any other suitable entity. As also described above, the gift account of the recipient can be held and/or maintained by the social networking system. Therefore, Blocks S130A and S130B can function to associate both the first monetary value of the first gift order and the monetary value of the second gift order with the gift account of the recipient such that the recipient can subsequently access the funds through the gift card in order to provide payment to and/or complete a transaction with a merchant.

For example, Block S130A can link the first fund of the first monetary value with a financial account held at a bank and owned by the first merchant, wherein Block S130A links the first fund and the gift account through an account number and a transaction ID unique to the first gift order. In another example, Block S130A can link the first fund of the first monetary value with a first stored value account held by a bank in the name of the recipient, wherein Block S130A links the first fund and the gift account through a first account number unique to the first stored value account. Furthermore, in the foregoing example, Block S130B can link the second fund of the second monetary value with a second stored value account held by the bank in the name of the recipient, wherein Block S130B links the second fund and the gift account through a second account number unique to the second stored value account.

As described above, Blocks S110A and S110B can notify the recipient of the first and second gift orders, respectively, and request recipient approval thereof. In this implementation, Blocks S130A and S130B can link the first and second monetary values, respectively, in response to approval of the first and second gift orders, respectively, by the recipient. However, Blocks S130A and S130B can link the first and second funds of the first and second monetary values of the first and second gift orders to the gift account in any other suitable way.

Block S130A of the first method S100 recites, in response to a first purchase from the first merchant with the gift card, publishing a detail of the first purchase to a feed within the social networking system in accordance with a privacy setting of the recipient. Similarly, Block S140B of the first method S100 recites, in response to a second purchase from the second merchant with the gift card, publishing a detail of the second purchase to a feed within the social networking system in accordance with a privacy setting of the recipient. Generally, Block S140A and S140B function to publicize, on the social networking system, details of a transaction between a merchant and the recipient completed in whole or in part with the gift card. The feed can be social feed publically available to all users within the social networking system, limited to subscribers of a particular merchant profile within the social networking system, limited to connections (e.g., friends) of the recipient within the social networking system, etc. Alternatively, the feed can be a private feed within the social networking system, such as a private communication dialogue between the recipient and a sender within the social networking system, though the feed can be any other suitable feed within the social networking system.

As examples, the detail can be confirmation that a transaction between the recipient and a merchant occurred, confirmation that the gift card was used in a transaction between the recipient and a merchant, identification of one or more senders who gifted a monetary value that was applied to a recipient purchase at a merchant, a description or other identifier (e.g., SKU number) of a product purchased by the recipient from the merchant with the gift card, a description or other identifier of a second product purchased by the recipient at the time of purchase of a first product but without the gift card, a time of a transaction between the recipient and a merchant, the physical retail location at which a transaction between the recipient and a merchant occurred, a secondary payment source that the recipient used to complete a transaction with a merchant, other social networking system users who accompanied the recipient during a transaction with a merchant, a thank you note from the recipient to a respective sender following application of a gift fund to a purchase, a picture of an item purchased by the recipient with the gift card, or a product review of a product purchased by the recipient with the gift card. However, the detail of the transaction between the recipient and a merchant (e.g., the first merchant, the second merchant) can be any other suitable detail.

In one example implementation, Block S140A includes posting the detail of the transaction between the recipient and first merchant to a feed of the first merchant within the social networking system. For example, the first merchant can maintain a profile including a social feed within the social networking, wherein Block S140A posts the detail to the merchant's social feed following purchase of a product by the recipient from the merchant. In this example, the detail can be a description of the product such that connections (e.g., friends) of the recipient can see that the recipient purchased the product when visiting the merchant's feed. Alternatively, in this example, the detail can be a description of the product and a general identifier of the recipient (e.g., age and gender) such social networking users can review the purchased product and a demographic of the recipient when visiting the merchant's feed.

As shown in FIG. 9, in another example implementation, Block S140A includes posting the detail of the transaction between the recipient and the first merchant to a feed of the recipient within the social networking system. For example, the feed of the recipient can be linked to a profile of the recipient within the social networking system Block S140A can thus post a description of the a product purchased by the recipient from the first merchant and a time and/or date of the transaction to the recipient's social feed such that connections (e.g., friends) of the recipient can see the detail of the purchase by the recipient when reviewing the recipient's feed.

In yet another example implementation, Block S140A includes posting the detail of the transaction between the recipient and the first merchant to a feed of the first sender within the social networking system. In this example implementation, Block S140A can function to notify the first sender that the recipient applied a gift from the first sender to a purchase. Block S140A can further inform the first sender how the first gift was used, such as by posting when the recipient used the first gift, what the recipient purchased, where the recipient made the purchase, and/or what else the recipient purchased in addition to the product. In this example implementation, Block S140A can further include prompting the recipient capture a photograph of a product of the first purchase, uploading the photograph to the social networking service, and posting the photograph to the social feed of the first sender. Block S140A can thus prompt the recipient to provide to the first user relevant details of the transaction incorporating the first user's gift.

However, Block S140A can post any other detail of the first transaction to any suitable feed within the social networking system. Block S140A can also prompt, handle, and/or distribute a private message between the recipient and the first sender in response to the first transaction between the recipient and the first merchant that includes application of the first gift order to a purchase from the merchant. Block S140B can implement similar techniques to post a detail of the second transaction to any suitable feed within the social networking system.

Figure 2:
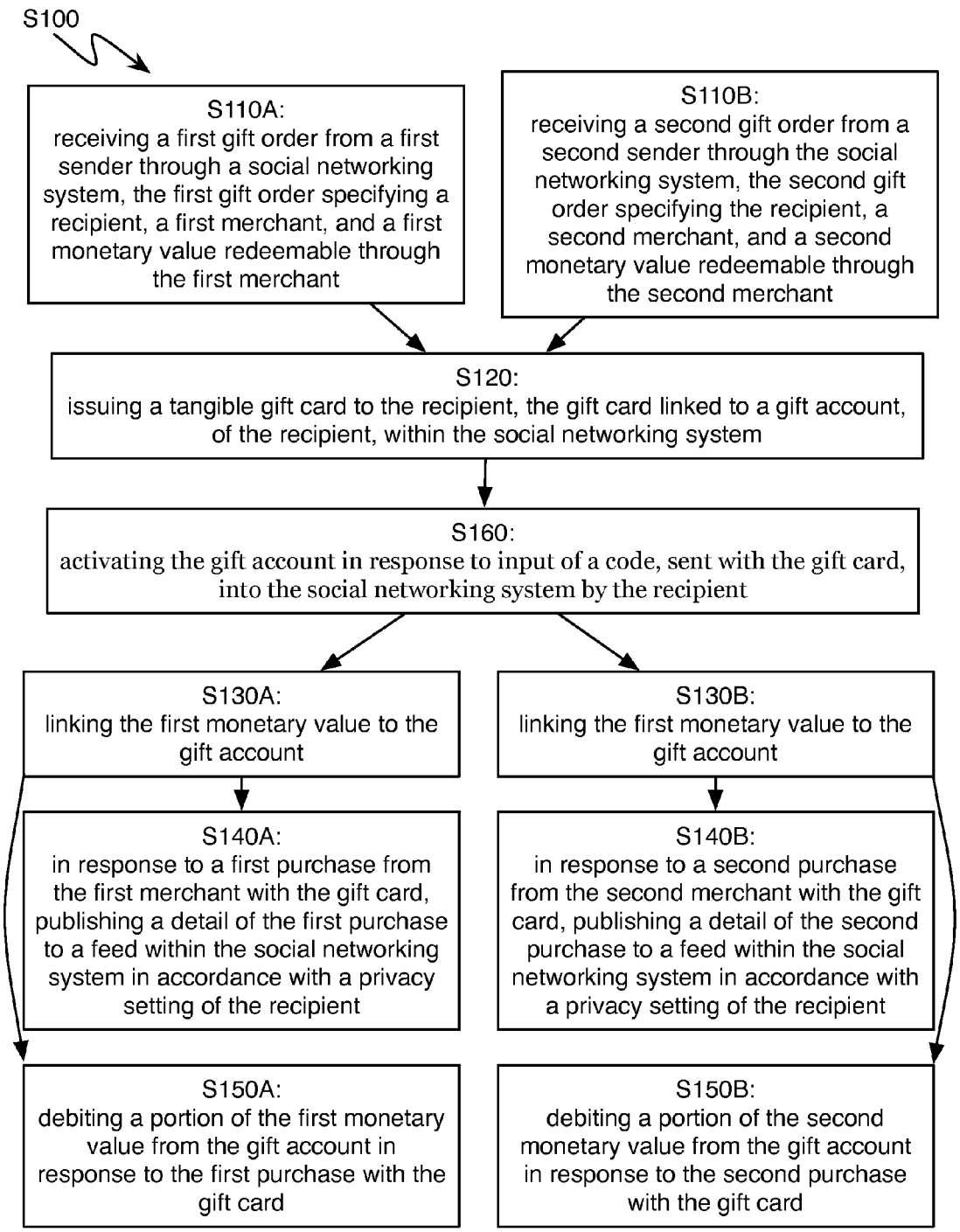
FIG. 2 is a flowchart representation of a variation of the first method.

As shown in FIG. 2, one variation of the first method S100 further includes Block S150A, which recites debiting a portion of the first monetary value from the gift account in response to the first purchase with the gift card. Similarly, as shown in FIG. 2, one variation of the first method S100 further includes Block S150B, which recites debiting a portion of the second monetary value from the gift account in response to the second purchase with the gift card. Generally, Block S150A functions to update a balance of the first gift within the gift account of the recipient following application of all or a portion of the first monetary value to a purchase from the first merchant. By reducing (i.e. debiting) an available balance of the first gift fund according to a recent purchase with the first gift fund through the gift card, Block S150A can enable the recipient to track a current gift balance of the first gift from within the gift account (e.g., from within the recipient-side interface within the social networking system). When applicable, Block S150A can additionally or alternatively trigger release of all or a portion of the first gift fund to a financial account of the first merchant. For example, Block S150A can trigger release of a portion of the first gift fund, held in a stored value account associated with the social networking system, to a bank account owned by the first merchant and held by a bank. Therefore, Block S150A can function to maintain account balances for the recipient and/or trigger distribution of the first gift fund according to purchases by the recipient with the gift card. Block S150B can similarly function to debit a portion of the second monetary value from the gift account in response to the second purchase with the gift card. However, Blocks S150A and S150B can function in any other suitable way.

As shown in FIG. 2, one variation of the method further includes Block S160, which recites activating the gift account in response to recipient entry of a code, mailed to the recipient with the gift card, into the social networking system. Generally, Block S160 functions to activate the gift card as a valid redemption pathway for the gift funds in the recipient's gift account once the recipient enters an activation code associated with the gift card. For example, in the implementation in which the gift card is mailed to the recipient through a postal service, the gift card can be mailed with a four-digit activation code and instructions to enter the four-digit activation code into the recipient's gift account to activate the gift card. In this example, Block S160 can receive the four-digit activation code from the recipient through the recipient-side interface within the social networking system, authenticate the activation code (e.g., by comparing against an encrypted code stored on a remote server), and activate the gift card once the code is authenticated. In this example, the gift can be used to access gifts within the gift account only once Block S160 activates the gift card through some authentication process, and by activating the gift card, Block S160 can thus unlock the gift card for future use by the recipient. However, Block S160 can function in any other way activate the gift card.

Figure 3:
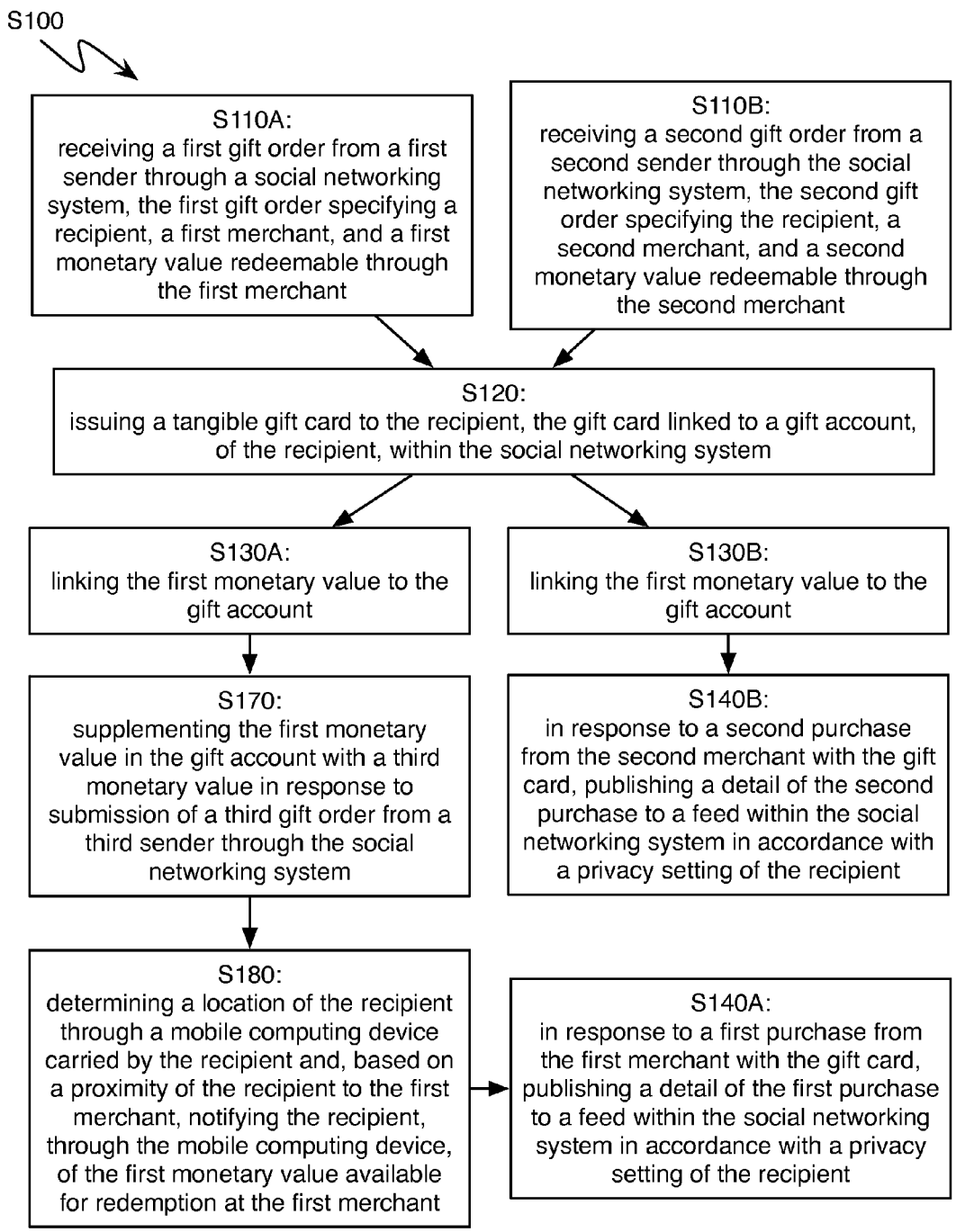
FIG. 3 is a flowchart representation of a variation of the first method.

As shown in FIG. 3, one variation of the method includes Block S170, which recites supplementing the first monetary value in the gift account with a second monetary value in response to submission of a third gift order from a third sender through the social networking system, the third gift order specifying the recipient, the first merchant, and the third monetary value redeemable through the first merchant. Generally, Block S170 functions to combine gift funds from two gift orders specifying the same merchant into one effective gift fund applicable to a purchase at the merchant. Block S170 can trigger aggregating of the gift funds from the first and third gift orders into one financial account, such as one stored value account held by a bank or one private account of the social networking system, or Block S170 can monitor the status of two separate accounts, one holding the first gift fund and the second holding the second gift fund, and sum current first and second gift fund values for the benefit of the recipient within the recipient-side interface.

Therefore, the method can enable multiple senders to gift the recipient gift funds specifying the same merchant, wherein Block S170 combines and/or sums the gift funds to enable the recipient to apply multiple gift funds from multiple gift orders for a single purchase at a specified merchant. Similarly, the method can enable multiple senders to gift the recipient gift funds specifying the same merchant over time, wherein Block S170 combines and/or sums a previous partial (e.g., partially exhausted) gift fund with a new gift fund specifying the same merchant as the previous gift fund such that the gift fund balance applicable to the merchant can be occasionally or continually replenished. The method can further enable one sender to gift the recipient multiple gift funds specifying the same merchant over time, wherein Block S170 combines and/or sums previous gift funds with a new gift fund such that the recipient can review and apply the whole gift fund balance applicable to a purchase from the merchant. However, Block S170 can function in any other way to supplement the first monetary value in the gift account with the third monetary value in response to submission of the third gift order from the first or other sender through the social networking system.

As shown in FIG. 3, one variation of the method further includes Block S180, which recites determining a location of the recipient through a mobile computing device carried by the recipient and, based on a proximity of the recipient to the first merchant, notifying the recipient, through the mobile computing device, of the first monetary value available for redemption at the first merchant. Generally, Block S180 functions to determine a proximity of the recipient to a merchant for which the recipient has an available gift fund and to notify the recipient of a present opportunity to transact with the merchant via an applicable gift fund linked to the gift card.

For example, Block S180 can receive recipient location data from a global positioning system (GPS) module in a mobile computing device (e.g., smartphone) carried by the recipient, and Block S180 can subsequently compare the GPS location of the mobile computing device to known locations of merchants specified in current gift orders in the recipient's gift account. When Block S180 identifies that the mobile computing device (and therefore the recipient) is within a threshold distance from a particular merchant, such as within a mile if the recipient is driving or within three city Blocks if the recipient is walking, Block S180 can push a notification to the recipient's mobile computing device. The notification can be an email, a SMS text message, a popup notification, a notification in a native application, or any other suitable form of communication. The notification can also include any of an identifier of the local merchant, the location of the merchant, an available gift balance with the merchant, store hours of the merchant, in-stock products at the merchant, sale items at the merchant, products carried by the merchant and liked by the recipient within the social networking system, products carried by the merchant and of determined interest of the recipient based on a demographic of the recipient, products carried by the merchant and recently purchased by a connection (e.g., friend) of the recipient within the social networking system, or any other suitable or relevant information.

Alternatively, Block S180 can determine the location of the recipient based on cellular tower triangulation, a recipient check-in at a nearby location, a recent tag in a picture posted to a feed within the social networking system and indicating recipient proximity to a specified merchant, or any other suitable data or action entered or collected by the recipient, a connection of the recipient, and/or a third-party. However, Block S180 can function in any other way to notify the recipient of his proximity to a merchant specified in a gift order in the recipient's gift account.

Figure 4:
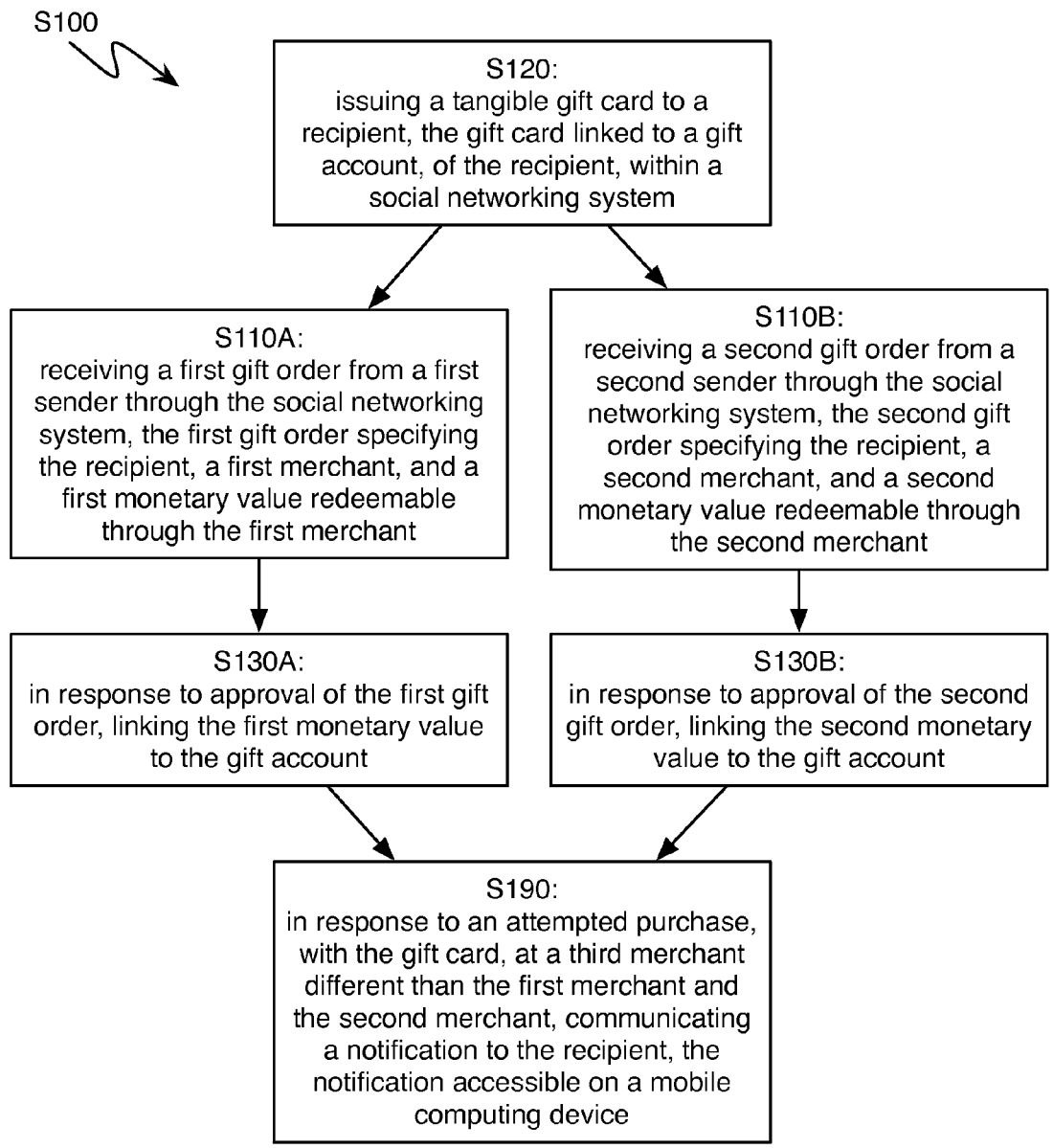
FIG. 4 is a flowchart representation of a variation of the first method.

As shown in FIG. 4, one variation of the first method S100 includes: issuing a tangible gift card to a recipient in Block S120, the gift card linked to a gift account, of the recipient, within a social networking system; receiving a first gift order from a first sender through the social networking system in Block S110A, the first gift order specifying the recipient, a first merchant, and a first monetary value redeemable through the first merchant; receiving a second gift order from a second sender through the social networking system in Block S110B, the second gift order specifying the recipient, a second merchant, and a second monetary value redeemable through the second merchant; in response to approval of the first gift order, linking the first monetary value to the gift account in Block S130A; in response to approval of the second gift order, linking the second monetary value to the gift account in Block S130B; and in response to an attempted purchase, with the gift card, at a third merchant different than the first merchant and the second merchant, communicating a notification to the recipient, the notification accessible on a mobile computing device in Block S190.

The foregoing variation of the first method S100 functions to handle lost, misplaced, or stolen gift cards. Because the gift card is not directly linked to a particular gift fund but rather indirectly linked to gift funds through the recipient's gift account within the social networking system, the gift card is effectively gift order agnostic and is applicable to any number of gift orders for any number of merchants, such as merchants selected from a list of participating merchants. Also, because the gift card is linked to gift funds through the gift account and is not necessarily physically (i.e. visually) updated with current balances available at various merchants, only those with access to the gift account (e.g., the recipient) can retrieve a current list of gift funds available at a certain merchants through the gift card. In particular, the recipient (and others with access to the gift account and/or informed by the recipient) can learn what gift funds are available on the gift card and where the gift card is applicable by accessing the gift account, but another individual would not be privy to the same information without access to the recipient's gift account. Therefore, a lost, misplaced, or stolen gift card would unlikely to be of benefit to another individual because that individual would be unlikely to know the particular merchants for which the gift card is linked to current and available gift funds. Once in possession of the lost, misplaced, or stolen gift card, the individual may attempt a transaction with the gift card at a merchant for which the recipient's gift account lacks a valid gift fund. This variation of the first method S100 may throw a flag in response to such improper application of the gift card and thus notify the recipient accordingly.

Block S190 of the forgoing variation of the first method S100 recites, in response to an attempted purchase, with the gift card, at a third merchant different than the first merchant and the second merchant, communicating a notification to the recipient, the notification accessible on a mobile computing device. Generally, Block S190 functions to inform the recipient that an invalid transaction was attempted with the gift card. Therefore, in response to an improper gift card transaction attempt, Block S190 can send any one or more of an email, a SMS text message, a popup notification, a notification in a native application, a notification with the recipient's profile within the social networking system, or any other suitable form of communication to the recipient. The notification can be transmitted to a mobile computing device associated with the recipient, such as a smartphone or tablet, or pushed to an account associated with the recipient (e.g., email account) such that the recipient can access the notification on any one or more computing devices. The notification can therefore specify that an invalid transaction was attempted, when the transaction was attempted, and/or where the invalid transaction was attempted.

Block S190 can further request confirmation that recipient is no longer in possession of the gift card. For example, the notification can include a "ignore" input field, wherein selection of the "ignore" field indicates that the attempted card transaction was a mistake (e.g., the recipient still holds the gift card). The notification can also include a "wasn't me" input field, wherein selection of the "wasn't me" field indicates that the recipient did not attempt the transaction and that the gift card is therefore no longer in the recipient's possession. Alternatively, the notification can direct the recipient to an alternative interface, such as the recipient-side interface within the social networking system or a web page within a web browser, wherein the recipient can similarly specify whether he made a mistake in selecting the gift card for a transaction or lost the gift card. However, Block S190 can request and/or receive a recipient input regarding the status of the gift card in any other suitable way.

In an instance in which Block S190 receives an input from the recipient that indicates that the gift card was lost, misplaced, or stolen, Block S190 can further dissociate the gift card from the gift account. Generally, Block S190 can sever a link between the recipient's gift account and the gift card such that the gift card can no longer be used to access a gift fund from the recipient's gift account. For example, if Block S120 issued the gift card with a unique identification number to the recipient and Block S160 activated the gift card by associated the unique identification number of the gift card with the gift account, Block S190 can dissociate the gift card from the gift account by removing the unique identification number of the gift card from the gift account. However, Block S190 can dissociate the gift card from the gift account in any other suitable way.

Furthermore, once the gift card is removed from the recipient's gift account, Block S190 can issue a second gift card to the recipient. Like Block S120, Block S190 can assign the second (unique) physical gift card to the recipient and link the second gift card to the gift account. Furthermore, Block S190 can initiate delivery of the second gift card to the recipient once the (first) gift card is removed from the gift account and activate the second gift card once received by the recipient, such as similar to Block S160 described above. However, Block S190 can function in any other way to request confirmation that recipient is no longer in possession of the gift card, to dissociate the gift card from the gift account, and to issue the second tangible gift card to the recipient.

2. Second Method

Figure 6:
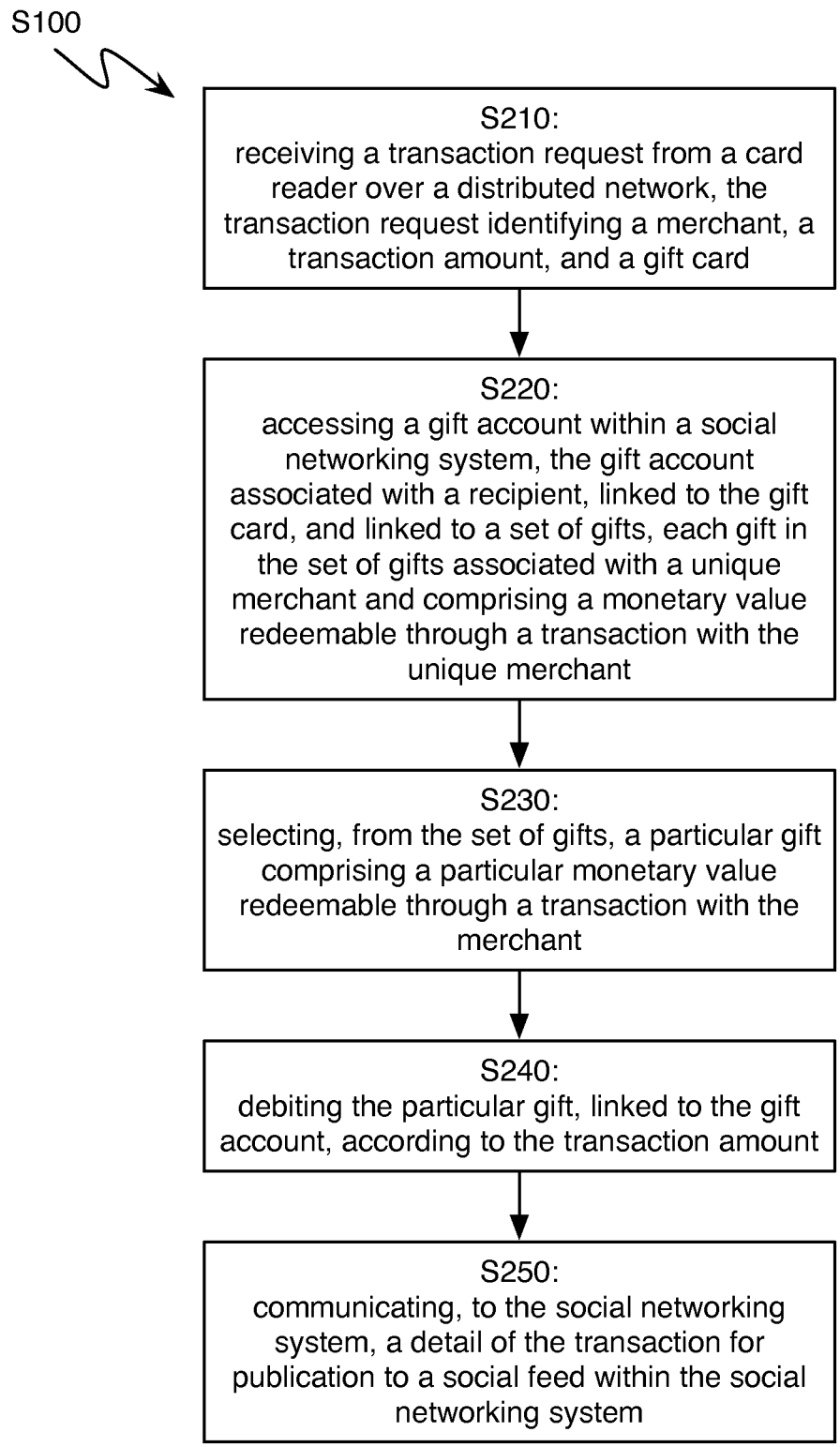
FIG. 6 is a flowchart representation of a second method of an embodiment.

As shown in FIG. 6, a second method S200 for enabling gift card transactions includes: receiving a transaction request from a card reader over a distributed network in Block S210, the transaction request identifying a merchant, a transaction amount, and a gift card; accessing a gift account within a social networking system in Block S220, the gift account associated with a recipient, linked to the gift card, and linked to a set of gifts, each gift in the set of gifts associated with a unique merchant and comprising a monetary value redeemable through a transaction with the unique merchant; selecting, from the set of gifts, a particular gift comprising a particular monetary value redeemable through a transaction with the merchant in Block S230; debiting the particular gift, linked to the gift account, according to the transaction amount in Block S240; and communicating, to the social networking system, a detail of the transaction for publication to a social feed within the social networking system in Block S250.

Figure 10:
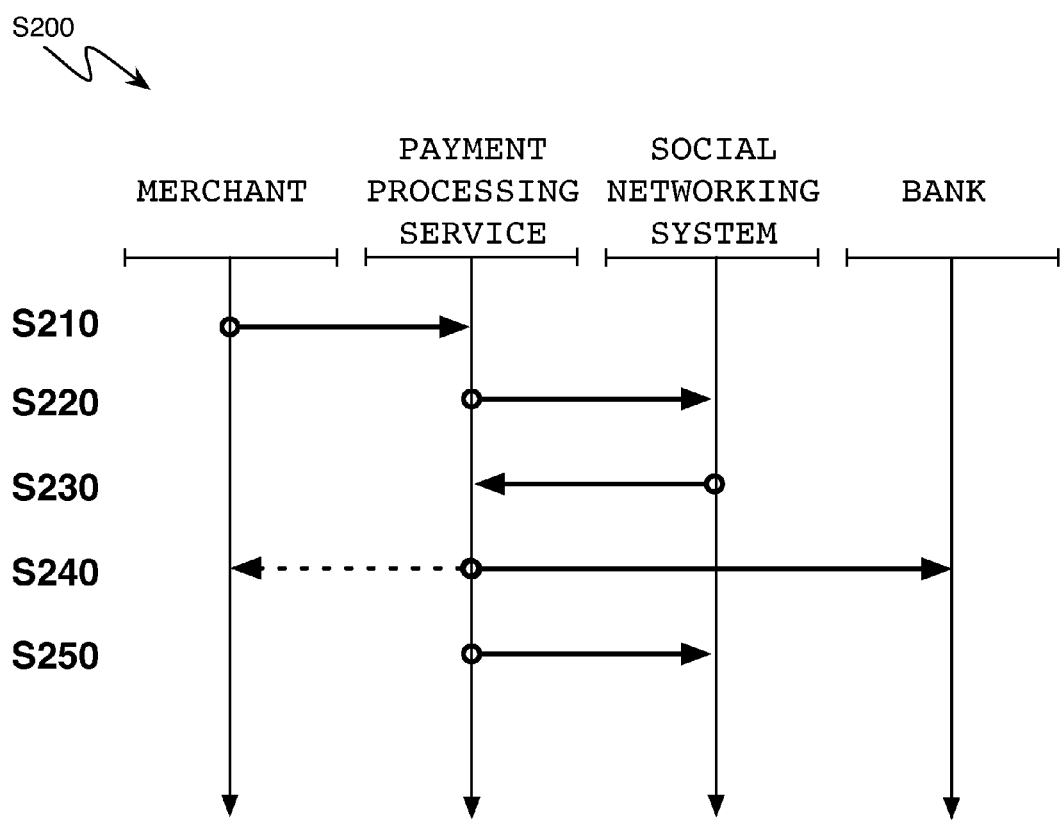
FIG. 10 is a flowchart representation of a variation of the second method.

As shown in FIG. 10, the second method S200 generally functions to enable the first method by receiving a transaction request from a merchant, identifying the transaction as made with a gift card of the first method, selecting a gift fund within the a gift account associated with the gift card and applicable to the merchant, and releasing all or a portion of the selected gift fund to the merchant to complete the transaction.

Generally, the second method S200 can be implemented by a payment processing service connected to a network of credit card readers held by various merchants, such as through the Internet. The payment processing service can be implemented on a remote server further connected to the social networking system of the first method and to a bank or other financial institution that holds the gift funds described above. For example, the payment processing service can handle credit, debit, and/or gift card- (e.g., plastic-) based transactions by validating transactions and reconciling the financial account of merchants, consumers, banks, social networking systems, etc. according to validated transaction requests. The payment processing service can be further connected to a commerce database that collects consumer data and/or to an advertisement database that aggregates consumer data and targets advertisements to consumers. Therefore like the first method, the second method S200 can be implemented by a computer system, such as a payment processing system, platform, or infrastructure, to complete card-based transactions between merchants and consumers. The computer system can be a cloud-based computer (e.g., Amazon EC3), a mainframe computer system, a grid-computer system, or any other suitable computer system. However, the second method S200 can be implemented by any other entity connected to a payment platform in any other suitable way.

Block S210 of the second method S200 recites receiving a transaction request from a card reader over a distributed network, the transaction request identifying a merchant, a transaction amount, and a gift card. Generally, Block S210 functions to collect initial details of a transaction made with the gift card, such as a merchant ID, a monetary (e.g., dollar) amount of the transaction (e.g., total cost or merchandise plus local and state taxes), and identifying information extracted from the gift card. For example, Block S210 can receive the transaction request from a magnetic stripe card reader configured to read data stored on a magnetic stripe of the gift card, wherein the magnetic stripe card reader communicates with Block S210 over the Internet. However, Block S210 can function in any other way to receive the transaction request.

Block S220 of the second method S200 recites accessing a gift account within a social networking system, the gift account associated with a recipient, linked to the gift card, and linked to a set of gifts, each gift in the set of gifts associated with a unique merchant and comprising a monetary value redeemable through a transaction with the unique merchant. Generally, Block S220 functions to extract a gift card identifier from the transaction request and, based on the gift card identifier, to select a particular gift account linked to the gift card of the first method. For example, as described in the first method above, the gift card can include a magnetic stripe programmed with a unique serial number, code, or other unique identifier linked to a gift account of a recipient, and Block S220 can implement the unique identifier to select and access the particular gift account linked to the gift card.

By accessing the gift account, Block S220 can establish a connection between the transaction request, a gift account within a social networking system, and a recipient who owns the gift account. As described in the first method above, the gift account is linked to a set of (i.e. one or more) segregated balances, each segregated balance defining a remaining monetary value of a gift fund gifted to the recipient through the social networking system by a sender. Furthermore, each segregated balance can be applied to a purchase from a particular merchant through the gift card linked to the gift account. However, Block S220 can function in any other way to access the gift account within the social networking system.

Block S230 of the second method S200 recites selecting, from the set of gifts, a particular gift comprising a particular monetary value redeemable through a transaction with the merchant. As described above in the first method, each gift in the set of gifts specifies the recipient, a monetary value, and a merchant, and the gift account of the recipient (accessed in Block S220) can be linked to multiple gifts specifying various merchants. Therefore, Block S230 can function to select a particular gift that specifies the merchant identified in the transaction request. For example, each gift in the gift account can include a merchant ID of the merchant for which the monetary value of the gift is applicable. In this example, Block S230 can select the particular gift, from the set of gifts in the gift account, by matching the merchant ID received with the transaction request to a merchant ID specified by the particular gift. Similarly, at least one gift linked to the gift account can specify multiple merchant Ids, such as for a merchant with multiple retail locations, and Block S230 can select the particular gift than includes at least one merchant ID that matches a merchant ID received with the transaction request.

Block S230 can also select multiple gifts linked to the recipient's gift account and specifying the merchant identified in the transaction request, such as in the event that the amount of the transaction exceeds a total monetary value of a single gift in the recipient's gift account. Block S230 can therefore function to combine multiple gifts applicable to transactions with the merchant identified in the transaction request. For example, Block S230 can select a first particular gift and a second particular gift, wherein the first particular gift was sent to the recipient by a first sender and specifies the merchant and a first particular monetary value, and wherein the second particular gift was sent to the recipient by a second sender and specifies the merchant and a second particular monetary value different than the particular monetary value. In this example, Block S230 can pass both the first and second gifts to Block S240 such that the transaction can be processed by applying gift funds from both the first and second particular gifts.

Alternatively, for the gift account that includes multiple gifts specifying the merchant identified in the transaction request, Block S230 can select the particular gift from the set of suitable gifts according to a specified objective. For example, Block S230 can select the particular gift that most closely matches and exceeds the transaction value. In another example, Block S230 can select lowest-value gifts until the transaction value is met in order to exhaust as many open gift funds as possible for the transaction with the merchant. However, Block S230 can function in any other way to match the merchant identified in the transaction request with a particular gift linked to the gift account.

In instances in which Block S230 finds no match between the merchant identified in the transaction request and gifts linked to gift account, Block S230 can throw a flag indicating that an improper transaction with the gift account was attempted. This flag can be handled as described in Block S190 of the first method described above.

Block S240 of the second method S200 recites debiting the particular gift, linked to the gift account, according to the transaction amount. Generally, Block S240 can function similar to Block S150A (and Block S150B) described above.

In one implementation, Block S240 triggers the social networking system to update one or more balances within the gift account according to the transaction value. Block S240 can further trigger release of gift funds from the recipient's gift account to the merchant. For example, Block S240 can initiate transfer of gift funds from a stored value account to associated with the gift account to a financial account owned by the merchant and held at a bank. Block S240 can therefore reconcile gift funds in the recipient's gift account and/or a financial account of the merchant in response to a transaction between the merchant and the recipient with the gift card.

As described above, Block S230 can select multiple gift funds, in the gift account, to apply to the transaction. In this implementation, Block S240 can debit a full extent of the monetary value of a first particular gift in the gift account and can debit the second particular gift according to a remaining balance of the transaction. However, Block S240 can function in any other way to debit the particular gift according to the transaction amount.

Block S250 of the second method S200 recites communicating, to the social networking system, a detail of the transaction for publication to a social feed within the social networking system. Generally, Block S250 functions to enable Block S140A (and Block S140B) of the first method described above by communicating a detail of the transaction between the recipient and the merchant to the social networking system. For example, the detail can be an identity (e.g., name, location) of the merchant, an identity (e.g., name) of the recipient, a value of the transaction, an identifier of a product purchased by the recipient in the transaction (e.g., a stock-keeping unit (SKU) number), a description of the product purchased from the merchant with the gift card, an identifier of the particular gift fund or particular gifts applied to the transaction, a time of the transaction, an additional payment method used by the recipient to complete the transaction (e.g., cash, credit card), and/or any other suitable transaction-related information. As described above in Block S150A (and Block S150B), the detail can be published to a social feed of the recipient, the merchant, a sender of the gift used in the transaction, a brand of a product purchased from the merchant by the recipient with the gift card, and/or any other suitable feed within the social networking system.

3. Authentication of a Gift Giving Transaction

Figure 11:
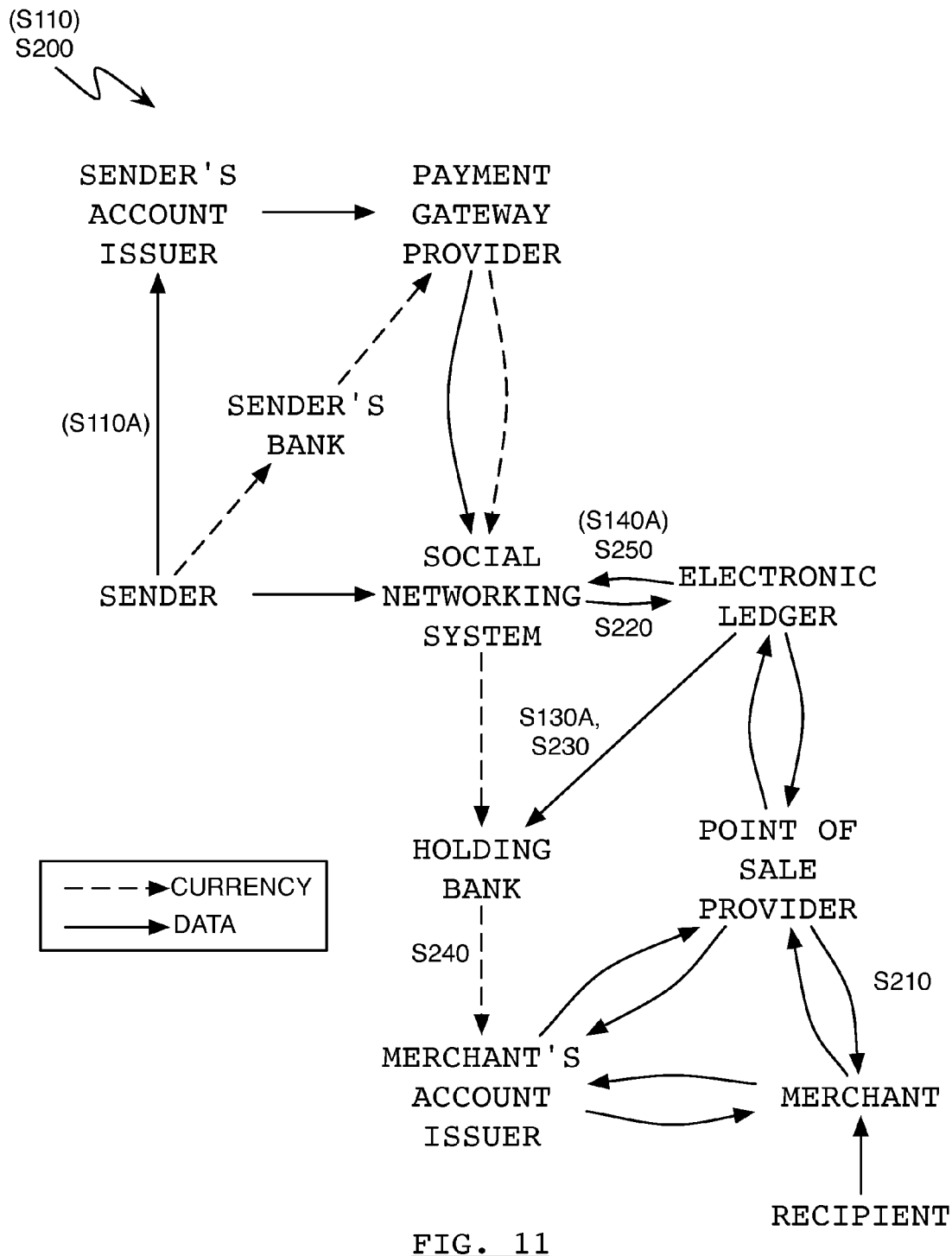
FIG. 11 is a flowchart representation of a variation of the first and second methods.

In one implementation, method S200 can cooperate to implement a flow of data and currency between the sender, the recipient, and a merchant as shown in FIG. 11. For example, when the sender submits a gift order for the recipient (e.g., Sam uses the social networking system to give a $10 Sephora gift card to Kelly), gift order details, such as the date, time, specified merchant, specified monetary value, and specified recipient can be transmitted to an account issuer of the sender (e.g., a credit card company) and to the social networking system. The social networking system can then initiate transmission of electronic funds from the sender's bank account to the payment gateway provider, which routes the funds and associated data through the social networking system to a holding bank. An electronic ledger system can collect the relevant data and add the data to a settlement ledger specifying when and where funds are held and to whom they belong (e.g., the recipient, the sender, the social networking system, the merchant). Once the recipient initiates a transaction with the merchant through the gift card, transaction data can be passed through the merchant to a point of sale provider that communicates with the electronic ledger and a financial account of the merchant. The point of sale provider can thus verify the transaction and later settle with the holding bank to pay the merchant for a purchase made by the recipient.

The social networking system can store relevant user data of the recipient, such as user identification information, user account information, a gift card number associated with the account, segregated balances for each remaining gift fund, etc. Furthermore, the electronic ledger can authenticate and track recipient purchases with one or more gift funds and update an internal ledger of the recipient accordingly. The social networking system can update the recipient's user data according to latest recipient information from the electronic ledger, thereby maintaining current records of the recipient's gift fund balances to reflect recipient data recorded by the electronic ledger. Method S200 can also implement a similar flow of data and currency between the sender, the recipient, and a merchant to handle item returns to the merchant.

4. Authentication of a Redemption Transaction

Figure 12:
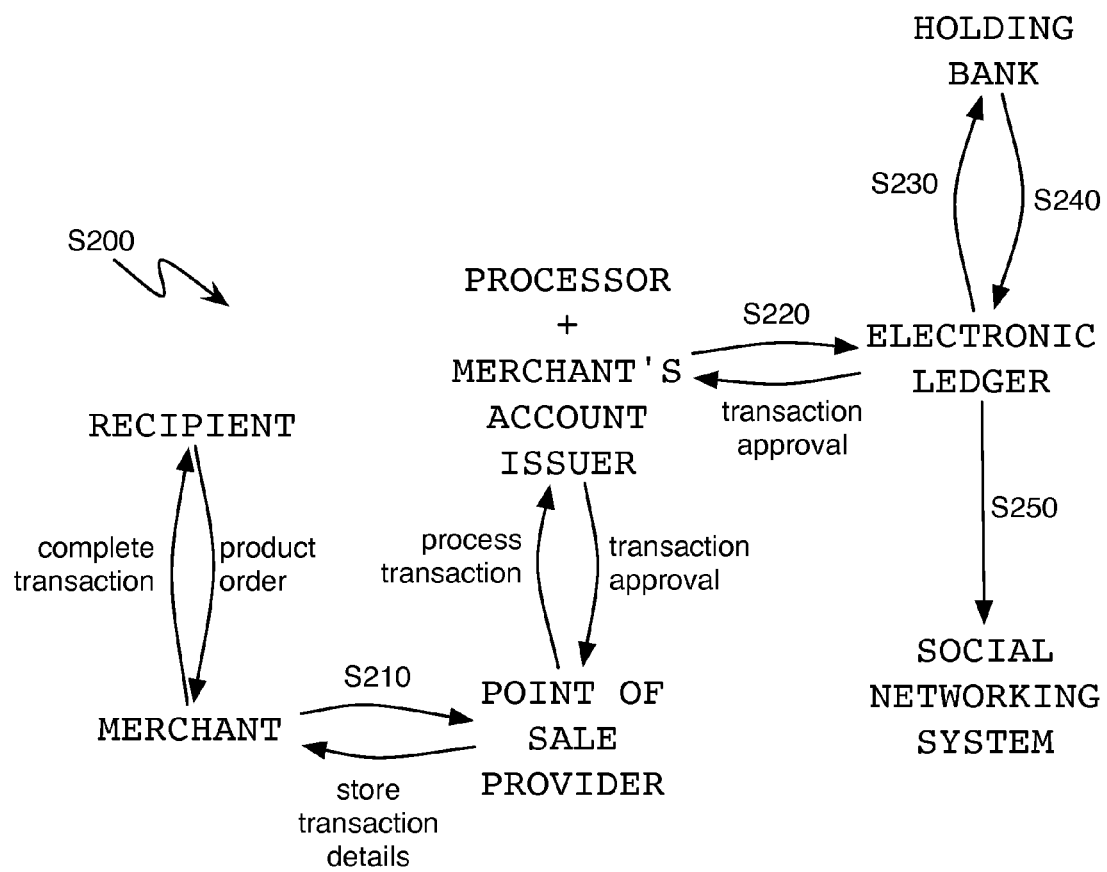
FIG. 12 is a flowchart representation of a variation of the second method.

Method S200 can also authenticate a gift card transaction between a merchant and the recipient. For example and as shown in FIG. 12, the merchant receives a product order detail, such as a price or description of the product. For example, gift card redemption at a merchant's brick and mortar store can be initiated with a swipe of the gift card at the point of sale terminal. The merchant can then pass order details to a point of sale provider in Block S210, which can pass the order details to an account issuer of the merchant. A processor in communication with the merchant's account issuer can subsequently pass order details to an electronic ledger in Block S220, which further passes the order details to a holding bank of the gifts fund in Block S230. The holding bank can then approve or decline the transaction and pass this decision back to the electronic ledger in Block S240, which further passes the decision to the processor and the merchant's account issuer. The processor then passes the decision back to the point of sale provider, which stores the order details and passes the decision to the merchant. Finally, the merchant can complete the transaction based on the decision set by the holding bank. In this example, though the social networking system manages the recipient's gift account and the segregated balances of gift funds that have been gifted to the recipient, the holding bank, rather than the social networking system, can interface with the point of sale provider and/or the electronic ledger to authenticate and complete the transaction. For example, if the point of sale provider and/or the electronic ledger interfaces with the social networking system to maintain a record of a recipient gift fund balance of a first amount and the user attempts to complete a purchase for a second amount greater than the first amount, the holding bank and/or electronic ledger can flag the purchase. In this example, the processor can communicate the flag to the point of sale provider to decline the transaction or to modify the transaction to both exhaust the balance of the gift fund and collect payment from an additional source. However, method S200 can authenticate a transaction between the merchant and the recipient in any other suitable way. Method S200 can similarly authenticate an item return to a merchant.

Failed partial authorizations can negatively impact a user's experience during redemption of the gift. In order to minimize a negative experience, a partial authorization request can be detected. As described herein, a partial authorization can be an authorization request for more than a non-zero balance available at a particular merchant. A partial authorization request can serve as an indication that the transaction was split tender (e.g., $10 on the gift card and $20 on a credit card). After detection of the partial authorization request, the method S200 can determine whether declines at the same merchant on the same gift card occur immediately after or within a short time after the partial authorization request is detected. In response, the method S200 can transmit a signal indicating that a clerk of the merchant was confused or otherwise mishandled processing of the partial authorization request and instead performed multiple swipes of the gift card for the full original transaction amount. Upon tracking this sequence of events and detecting the failed partial authorizations, method S200 can notify a user of the detected transaction condition. Furthermore, upon detection of the failed partial authorization, method S200 can authorize funds for release. Gift card funds can be locked until the authorization request expires, such as one week later. By unlocking or otherwise releasing the gift card funds, method S200 can enable the user to make another attempt at the transaction after providing feedback to the merchant's clerk.

5. Settlement

Figure 13:
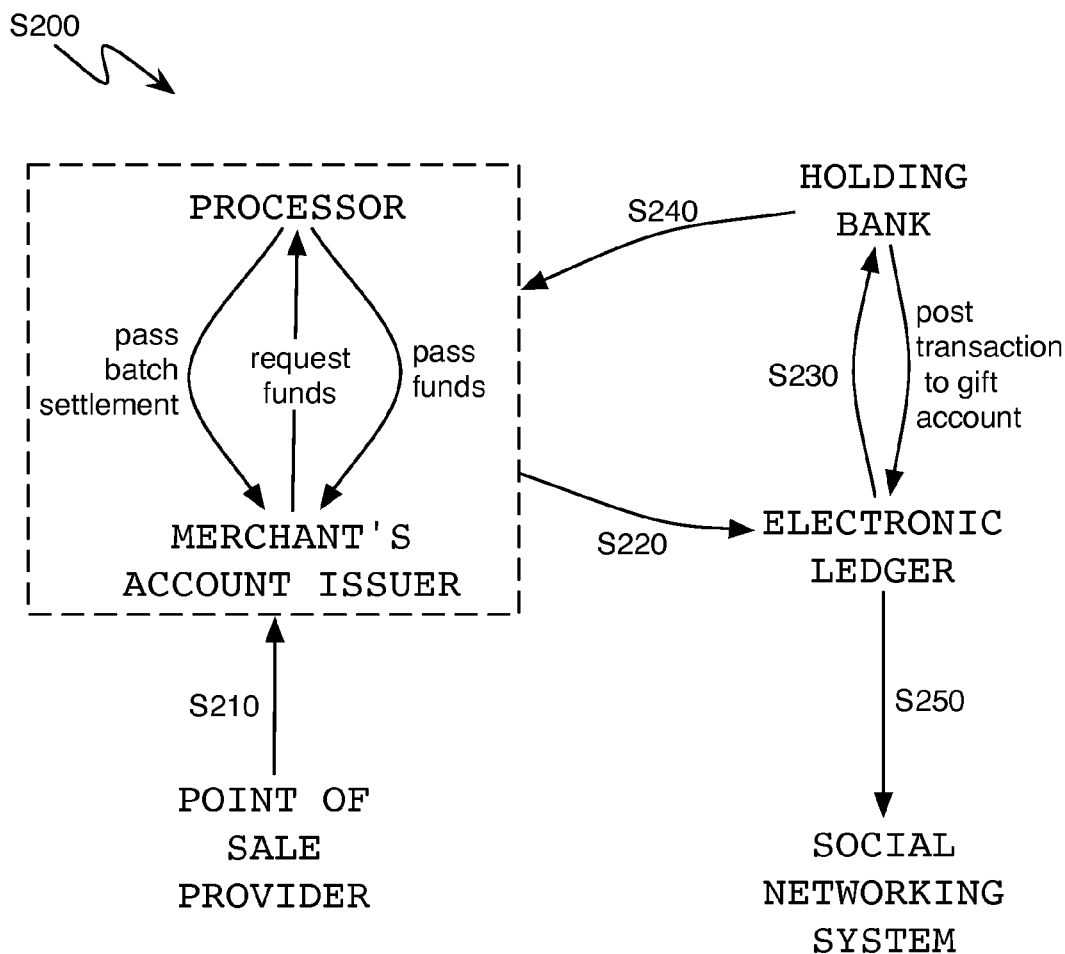
FIG. 13 is a flowchart representation of a variation of the second method.

Method S200 can further settle a gift transaction between the recipient and a merchant. For example, as shown in FIG. 13, the point of sale provider, in cooperation with method S200, can submit a periodic (e.g., daily, hourly, weekly, monthly, etc.) settlement batch of received transactions to the merchant's account issuer through a processor of the merchant's account issuer's in Block S210. The processor can then pass the settlement batch to the merchant's account issuer, which deposits appropriate funds into the merchant's account. The merchant's account issuer can then send a request for funding to the processor, and the processor can pass the funding request to the electronic ledger in Block S220. The electronic ledger can then pass the funding request to the holding bank in Block S230, and the holding bank can post the transaction to the gift account, used in the transaction, to the electronic ledger. The holding bank can subsequently pass the funds to the processor in Block S240, and the processor can pass the funds to the merchant's account issuer. In this example, though the social networking system can manage the recipient's gift account and the segregated balances of gift funds gifted to the recipient, the holding bank can interface with the point of sale provider and/or the electronic ledger to authenticate and complete the transaction.

Method S200 can also settle a balance between a merchant and the social networking system. For example, the holding bank and/or the electronic ledger can access a general or unique revenue share contract held between the merchant and the social networking system. The holding bank can then distribute the balance of a transacted gift fund between the social networking system and the merchant, such as 80% of the balance to the merchant and 20% of the balance to the social networking, system according to the applicable revenue share contract. Similarly, when the merchant offers a deal or discount, such as an offer for $5 off a purchase with use of the tangible gift card, method S200 can distribute a greater percentage of the balance to the social networking system, again according to stipulations of the revenue share contract. However, method S200 can settle a gift card transaction between the merchant and a recipient in any other suitable way. Method S200 can similarly settle item returns to a merchant. Furthermore, the first and second methods S100, S200 can cooperate in any other suitable way to collect, hold, and apply funds gifted to a recipient by a sender, the gifted funds applicable to purchases at one or more specified merchants.

6. Social Networking System

Figure 7:
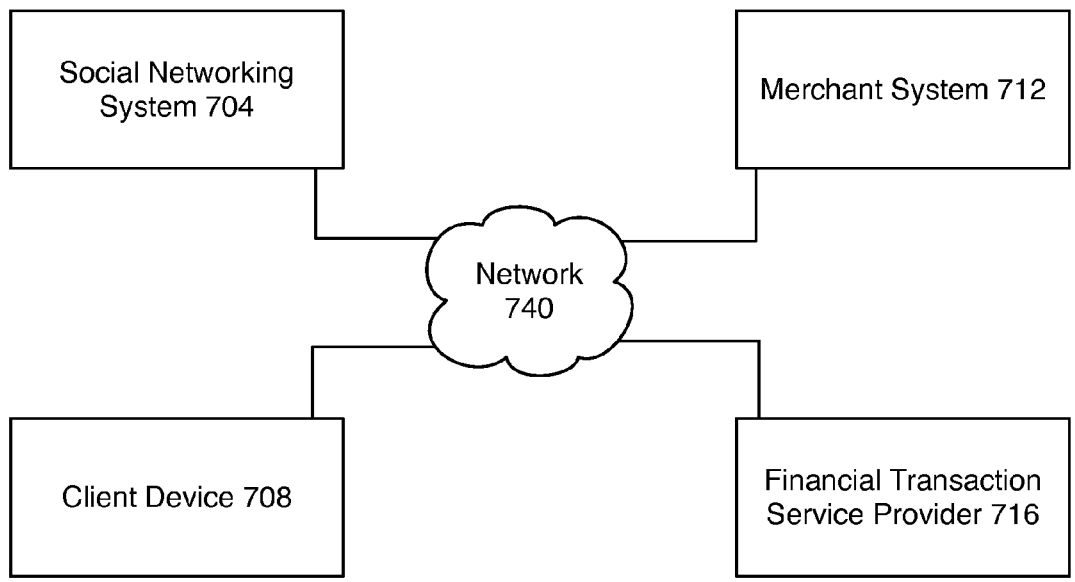
FIG. 7 is a Block diagram of a system environment for a social networking system.

FIG. 7 is a Block diagram of a system environment for a social networking system 704. The system environment, shown in FIG. 7, includes a social networking system 704, a client device 708, a merchant system 712, a financial transaction service provider 114, and a network 740. Alternatively, the system environment can include different and/or additional components than those shown in FIG. 7.

The social networking system 704, further described below in conjunction with FIG. 8, includes one or more computing devices storing user profiles associated with users and/or other objects as well as connections between users and other users and/or objects. In use, users join the social networking system 704 and then add connections to other users or objects of the social networking system to which they desire to be connected. As further described below in conjunction with FIG. 8, users of the social networking system 704 can be individuals or entities such as businesses, organizations, universities, manufacturers. The social networking system 704 allows its users to interact with each other as well as with other objects maintained by the social networking system 704. The social networking system 704 can therefore allow users to interact with third-party websites, such as the merchant system 712 and the financial transaction service provider 716. In one implementation, third-party developers can enable users of the social networking system to express interest in web pages hosted on websites external to the social networking system (e.g., third-party websites). These web pages can be represented as page objects in the social networking system as a result of embedding a widget, a social plug-in, programmable logic or code snippet into the web pages, such as an iFrame. Any concept that can be embodied in a web page can become a node in the social graph on the social networking system in this manner. As a result, users can interact with many objects external to the social networking system. Each of the interactions with an object can be recorded by the social networking system as an edge. These interactions can be used, for example, to identify a gift-appropriate event of the recipient. Enabling third-party developers to define object types and action types is further described in a related application, "Structured Objects and Actions on a Social Networking System," U.S. application Ser. No. 13/239,340 filed on Sep. 21, 2011, which is hereby incorporated by reference. In one embodiment, the interaction can be a comment associated with a content object hosted by a third party system, as further described in a related application, "Comment Plug-In for Third Party System," U.S. application Ser. No. 12/969,368 filed on Dec. 15, 2010. As such, the electronic communication may be entered into a comment field of an embedded widget, a social plug-in, programmable logic or code snippet into a third party web page, such as an iFrame Based on stored data about users, objects and connections between users and/or objects, the social networking system 704 generates and maintains a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which can result from an action that was performed by one of the nodes on the other node. For example, when a user identifies an additional user as a friend or confirms a friend request from another user, the methods can generate an edge in the social graph generated connecting a node representing the first user and an additional node representing the additional user. The generated edge has a connection type indicating that the users are friends. As various nodes interact with each other, the social networking system 704 modifies edges connecting the various nodes to reflect the interactions.

A client device 708 is a computing device capable of receiving user input as well as transmitting and/or receiving data via the network 740. In one implementation, the client device 708 is a conventional computer system, such as a desktop or laptop computer. In another implementation, the client device 708 can be a device having computer functionality, such as a personal digital assistant (PDA), mobile telephone, smart-phone or similar device. The client device 708 is configured to communicate with the social networking system 704, the merchant system 712 and/or the financial transaction service provider 716 via the network 740. In one implementation, the client device 708 executes an application allowing a user of the client device 708 to interact with the social networking system 704. For example, the client device 708 executes a browser application to enable interaction between the client device 708 and the social networking system 704 via the network 740. In another implementation, a client device 708 interacts with the social networking system 704 through an application programming interface (API) that runs on the native operating system of the client device 708, such as iOS or ANDROID operating system.

The client devices 708 are configured to communicate via the network 740, which can include any combination of local area and/or wide area networks, using both wired and wireless communication systems. In one implementation, the network 740 uses standard communications technologies and/or protocols. Thus, the network 740 can include links using technologies such as Ethernet, 802.11, worldwide interoperability for microwave access (WiMAX), 3G, 4G, CDMA, digital subscriber line (DSL), etc. Similarly, the networking protocols used on the network 740 can include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 740 can be represented using technologies and/or formats including hypertext markup language (HTML) or extensible markup language (XML). In addition, all or some of the links can be encrypted using conventional encryption technologies such as secure sockets layer (SSL), transport layer security (TLS), and Internet Protocol security (IPsec).

The merchant system 712 includes one or more servers providing content associated with a merchant. For example, the merchant system 712 provides web pages describing products and/or services sold by one or more vendors. The merchant system 712 can also perform other functions to allow the merchant to provide products or services in exchange for compensation. Examples of functions provided by the merchant system 712 include maintaining accounts for purchasers, tracking inventory levels, modifying pricing of products or services, obtaining compensation for products or services from the financial transaction service provider 716 and/or other suitable actions. The merchant system 712 communicates with the social networking system 704, and/or the financial transaction service provider 716 via the network 740.

The financial transaction service provider 716 processes virtual currency transactions between a merchant and a customer, such as credit, debit, private-label, gift, payroll, a prepaid card, and/or other virtual currency, credit, or debit transaction. The financial transaction service provider 716 therefore directs a fund from a financial account of a consumer to a financial account of a merchant in response to a consumer purchase and can further direct a fund from a merchant to a consumer, such as in response to a return or exchange. The financial transaction service provider 716 can further provide fraud protection and authentication solutions, electronic check acceptance services, and/or Internet commerce and mobile payment solutions.

Figure 8:
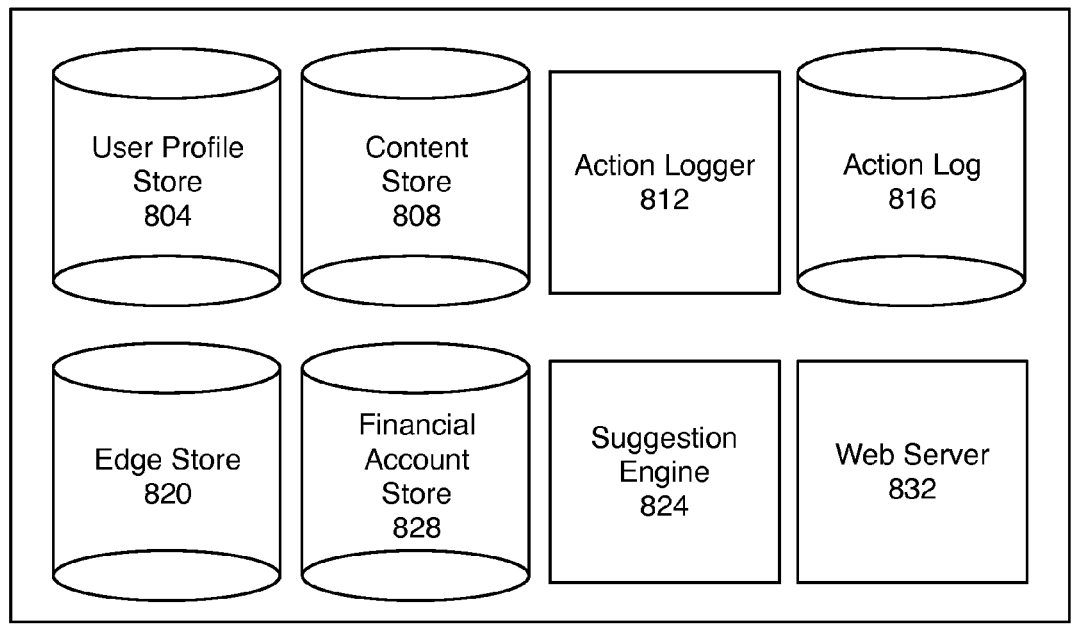
FIG. 8 is a Block diagram of a system architecture of the social networking system.

FIG. 8 is a Block diagram of a system architecture of the social networking system 704. The social networking system 704 shown in FIG. 8 includes a user profile store 804, a content store 808, an edge store 820, an action logger 214, an action log 832, a suggestion engine 824, a financial account store 828 and a web server 232. Alternatively, the social networking system 704 can include additional, fewer, or different modules for various applications. Conventional components such as network interfaces, security mechanisms, load balancers, failover servers, management and network operations consoles, and the like are not shown so as to not obscure the details of the system architecture.

Each user of the social networking system 704 is associated with a user profile, which is stored in the user profile store 804. A user profile includes declarative information about the user that was explicitly shared by the user, and can also include profile information inferred by the social networking system 704. In one implementation, a user profile includes multiple data fields, each data field describing one or more attributes of the corresponding user of the social networking system 704. The user profile information stored in user profile store 804 describes the users of the social networking system 704, including biographic, demographic, and other types of descriptive information, such as work experience, educational history, gender, hobbies or preferences, location and the like. A user profile can also store other information provided by the user, for example, images or videos. Images of users can be tagged with identification information of users of the social networking system 704 displayed in an image. A user profile in the user profile store 804 can also maintain references to actions by the corresponding user performed on content items in the content store 808 and stored in the edge store 820.

A user profile can be associated with one or more financial accounts, which enables tracking of prepaid gifts and redemption of those gifts when using an associated financial account. A user can specify one or more privacy settings, which can be stored in the user profile. The privacy settings can specify the content and quantity of (personal) user data that can be tracked, shared, and/or accessed by the social networking system 704. In one implementation, information from the financial account is stored in the user profile store 804. Alternatively, information can be stored in the financial account store 828.

The content store 808 stores content items associated with a user profile, such as images, videos or audio files. Content items from the content store 808 can be displayed when a user profile is viewed or when other content associated with the user profile is viewed. For example, displayed content items can show images or video associated with a user profile or show text describing a user's status. Additionally, other content items can facilitate user engagement by encouraging a user to expand his connections to other users, to invite new users to the system or to increase interaction with the social network system by displaying content related to users, objects, activities, or functionalities of the social networking system 704. Examples of social networking content items include suggested connections or suggestions to perform other actions, media provided to, or maintained by, the social networking system 704 (e.g., pictures or videos), status messages or links posted by users to the social networking system, events, groups, pages (e.g., representing an organization or commercial entity), and any other content provided by, or accessible via, the social networking system.

The content store 808 also includes one or more pages associated with entities having user profiles in the user profile store 804. An entity is a non-individual user of the social networking system 704, such as a business, a vendor, an organization or a university. A page includes content associated with an entity and instructions for presenting the content to a social networking system user. For example, a page identifies content associated with the entity's user profile as well as information describing how to present the content to users viewing the brand page. Merchants associated with merchant systems 712, further described above in conjunction with FIG. 7, can be associated with pages in the content store 808, allowing social networking system users to more easily interact with the merchant via the social networking system 704. A merchant identifier is associated with a vendor's page, allowing the social networking system 704 to identify the merchant and/or to retrieve additional information about the merchant from the user profile store 804, the action log 832 or from any other suitable source using the vendor identifier.

The action logger 812 receives communications about user actions on and/or off the social networking system 704, populating the action log 832 with information about user actions. Such actions can include, for example, adding a connection to another user, sending a message to another user, uploading an image, reading a message from another user, viewing content associated with another user, attending an event posted by another user, among others. Moreover, the actions can relate to a merchant. In one example, a user can "like" an object associated with the merchant, for example, by explicitly making that indication on the merchant's page in the social network. In another example, a user can comment on a merchant's page within the social network, share a story from the merchant's page, tag a photo associated with the merchant or a product or service provided by the merchant, become a fan of the merchant, check-in to a brick-and-mortar store of the merchant, or subscribe or follow the merchant. As described in U.S. patent application Ser. No. 13/239,340, which is incorporated herein by reference, the edge store 820 can correlate any one or more such user actions with an interest in the merchant or a product of service from the merchant, which can be useful in selection an appropriate gift for the user who is a recipient.

The action log 832 can be used by the social networking system 704 to track user actions on the social networking system 704, as well as external website that communicate information to the social networking system 704. Users can interact with various objects on the social networking system 704, including commenting on posts, sharing links, and checking-in to physical locations via a mobile device, accessing content items in a sequence or other interactions. Information describing these actions can be stored in the action log 832, and the extent and content of such interactions can be correlated with an affinity for the objects. Additional examples of interactions with objects on the social networking system 704 included in the action log 832 include commenting on a photo album, communications between users, becoming a fan of a musician, adding an event to a calendar, joining a group, becoming a fan of a brand page, creating an event, authorizing an application, using an application and engaging in a transaction. Additionally, the action log 832 records a user's interactions with advertisements on the social networking system 704 as well as other applications operating on the social networking system 704. Data from the action log 832 is used to infer interests or preferences of the user, augmenting the interests included in the user profile and allowing a more complete understanding of user preferences.

The action log 832 can also store user actions on external websites and/or determined from a financial account associated with the user. For example, an e-commerce website that primarily sells sporting equipment at bargain prices can recognize a user of a social networking system 704 through social plug-ins that enable the e-commerce website to identify the user of the social networking system 704. Because users of the social networking system 704 are uniquely identifiable, e-commerce websites, such as this sporting equipment retailer, can use the information about these users as they visit their websites. The action log 832 records data about these users, including webpage viewing histories, advertisements that were engaged, purchases made, and other patterns from shopping and buying, such as in accordance with privacy settings of the user. Actions identified by the action logger 812 from the transaction history of a financial account associated with the user allow the action log 832 to record further information about additional types of user actions.

In one embodiment, an edge store 820 stores information describing connections between users and other objects on the social networking system 704 as edge objects. Some edges can be defined by users, allowing users to specify their relationships with other users. For example, users can generate edges with other users that parallel the users' real-life relationships, such as friends, co-workers, partners, etc. Other edges are generated when users interact with objects in the social networking system 704, such as expressing interest in a page on the social networking system, sharing a link with other users of the social networking system, and commenting on posts made by other users of the social networking system. The edge store 820 stores edge objects that include information about the edge, such as affinity scores for objects, interests, and other users. For example, an affinity score between a user and a merchant can be stored. Affinity scores can be computed by the social networking system 704 over time to approximate a user's affinity for an object, interest, and other users in the social networking system 704 based on the actions performed by the user. Multiple interactions between a user and a specific object can be stored in one edge object in the edge store 820, in one embodiment. Connections between users can be stored in the user profile store 804, or the user profile store 804 can access the edge store 820 to determine connections between users.

In one implementation, the financial account store 828 includes financial account identifiers associated with user profiles and an association or mapping between a financial account and its corresponding user profile. A user can include additional information about the financial account in the financial account store, such as a description of the financial account and can also include authentication information for accessing the account such as names, passwords or other security credentials. In implementation in which information about user financial accounts are stored in the financial account store 828, the social networking system 704 can apply additional security measures (encryption, etc.) to the financial account store 828 to reduce the risk of unauthorized access to financial account information. Alternatively, financial account information can be included in the user profile store 804 as data in a user's user profile. One or more privacy settings can be applied to the financial account information to limit its accessibility to objects in the social networking system 704.

The suggestion engine 824 accesses data in the user profile store 804, user profile store 804, in the action log 832, and/or the content store 808 either individually or in combination and identifies one or more candidate products associated with vendors in which a user is likely to have an interest. Generally, the suggestion engine can analyze the action log 832, identify user actions related to one or more merchants, products, or services, calculate the user's affinity for one or more merchants, products, or services, and select a suitable gift for the user based on the user's affinity. The suggestion engine 824 can also collect offers for products from local merchants, wherein the products can be collected or fulfilled through a physical retail location and/or through e-commerce. The suggestion engine 824 can further calculate an affinity between a user who is a (potential) recipient and a second user who is a (potential) sender, such as based on interactions between the users including messages, posts, and/or other communications between the users within the social networking system, and select the second user as the sender based on the affinity between the users. The suggestion engine 824 can subsequently recommend the selected gift to the sender and facilitate sender purchase of the product for the recipient.

Actions between the user and pages maintained by the social networking system stored in the action log 832 can be used by the suggestion engine 824 to select candidate products. The suggestion engine 824 can analyze actions involving the user and various pages in the content store 808 as well as connections between the user and various pages in the edge store 820 to select candidate products. For example, the suggestion engine 824 selects candidate products based on the frequency of actions between the user and a page, the number of interactions between the user and the page, the type of connection between the user and a page, staleness of the interactions, a type of action between the user and a page or any other suitable criteria.

The financial account store 828 can store a financial account identifier of one or more user IDs or profiles within the social networking system. The financial account store 828 can cooperate with the financial transaction service provider to track gifts, gift values, gift description, gift contents, etc. for a particular merchant and control application of a gift to a recipient purchase based on an identified match between a gift and a recipient purchase at the particular merchant. For example, the financial account store 828 can analyze merchant transactions, match a user social network ID to the purchase, and select an available gift affiliated with the user and redeemable at the merchant. The financial account store 828 can then communicate this information to the financial transaction service provider to initiation deduction of the gift amount from the recipient's bill without exposing user (e.g., sender or recipient) identification information to the financial transaction service.

The web server 232 links the social networking system 704 via the network 740 to the client device 708, to the financial transaction service provider 716 and/or to the merchant system 712. The web server 232 serves web pages, as well as other web-related content, such as Java, Flash, XML and so forth. The web server 232 can provide the functionality of receiving and routing communications between the social networking system 704 and the client device 708, for example, instant messages, queued messages (e.g., email), text and SMS (short message service) messages, or messages sent using any other suitable messaging technique. A user can send a request to the web server 232 to upload information, for example, images or videos that are stored in the content store 808. Additionally, the web server 232 can provide application programming interface (API) functionality to send data directly to native client device operating systems, such as iOS, ANDROID, webOS, or RIM operating system. The web server 232 also provides API functionality for exchanging data, such as financial account information, between the social networking system 704 and the financial transaction service provider 716.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
receiving a first gift order from a first sender through a social networking system, the first gift order specifying a recipient, a first merchant, and a first monetary value redeemable through the first merchant;
linking the first monetary value to a gift account within the social networking system;
receiving a second gift order from a second sender through the social networking system, the second gift order specifying the recipient, a second merchant, and a second monetary value redeemable through the second merchant;
linking the second monetary value to the gift account;
issuing a tangible gift card to the recipient, the tangible gift card linked to the gift account, of the recipient, within the social networking system, wherein the tangible gift card does not visually identify the first merchant or the second merchant;
receiving, an indication of a first purchase with the tangible gift card from a first point of sale system that is not a part of the social networking system;
in response to receiving the indication of the first purchase with the tangible gift card from the first point of sale system, determining whether a merchant associated with the first point of sale system is associated with a monetary value linked to the gift account;
if the merchant associated with the first point of sale system is associated with a monetary value linked to the gift account, publishing a detail of the first purchase to a feed within the social networking system in accordance with a privacy setting of the recipient; and
if, the merchant associated with the first point of sale system is not associated with a monetary value linked to the gift account, flagging the indication of the first purchase as fraudulent.

2. The method of claim 1, further comprising: debiting a portion of the first monetary value from the gift account in response to the first purchase with the tangible gift card.

3. The method of claim 1, wherein receiving the first gift order comprises receiving the first gift order at a first time, and wherein receiving the second gift order comprises receiving the second gift order at a second time later than the first time.

4. The method of claim 1, wherein receiving the first gift order comprises receiving a selection of the first merchant from a set of participating merchants.

5. The method of claim 1, wherein issuing the tangible gift card comprises sending, through a postal service, the tangible gift card branded with a logo of the social networking system.

6. The method of claim 5, further comprising activating the gift account in response to recipient entry of a code, mailed to the recipient with the tangible gift card, into the social networking system.

7. The method of claim 1, wherein linking the first monetary value to the gift account comprises notifying the recipient of the first gift order and linking the first monetary value in response to approval of the first gift order by the recipient.

8. The method of claim 1, further comprising supplementing the first monetary value in the gift account with a third monetary value in response to submission of a third gift order from a third sender through the social networking system, the third gift order specifying the recipient, the first merchant, and the third monetary value redeemable through the first merchant.

9. The method of claim 1, wherein publishing the detail of the first purchase to the feed comprises posting the detail to a feed of the first merchant within the social networking system.

10. The method of claim 1, further comprising prompting, via the social networking system, the recipient to capture a photograph of a product of the first purchase, uploading the photograph to the social networking system, and posting the photograph to a social feed of the first sender.

11. The method of claim 1, further comprising determining a location of the recipient through a mobile computing device carried by the recipient and, based on a proximity of the recipient to the first merchant, notifying the recipient, through the mobile computing device, of the first monetary value available for redemption at the first merchant.

12. A system comprising:
at least one processor; and
at least one non-transitory computer readable medium storing instructions thereon that, when executed by the at least one processor, cause the system to:
receive a first gift order from a first sender through a social networking system, the first gift order specifying a recipient, a first merchant, and a first monetary value redeemable through the first merchant;

link the first monetary value to a gift account associated with the recipient;

receive a second gift order from a second sender through the social networking system, the second gift order specifying the recipient, a second merchant; and a second monetary value redeemable through the second merchant;

link the second monetary value to the gift account associated with the recipient;

issue a tangible gift card to the recipient, the tangible gift card linked to the gift account, of the recipient, within the social networking system, wherein the tangible gift card does not visually identify the first merchant or the second merchant;

receive indication of a first purchase with the tangible gift card from a first point of sale system that is not a part of the social networking system;

based on receiving the indication of the first purchase with the tangible gift card from the first point of sale system, determine whether a merchant associated with the first point of sale system is associated with a monetary value linked to the gift account;

if the merchant associated with the first point of sale system is associated with a monetary value linked to the gift account, publish a detail of the first purchase to a feed within the social networking system; and if the merchant associated with the first point of sale system is not associated with a monetary value linked to the gift account, flag the indication of the first purchase as fraudulent.

13. The system recited in claim 12, further comprising instructions that, when executed by the at least one processor, cause the system to access privacy settings corresponding to the recipient, wherein publishing the detail of the first purchase to the feed within the social networking system comprises publishing the detail according to the privacy settings.

14. The system recited in claim 13, further comprising instructions that, when executed by the at least one processor, cause the system to debit a portion of the first monetary value from the gift account in response to the first purchase with the tangible gift card.

15. The system recited in claim 14, further comprising instructions that, when executed by the at least one processor, cause the system to provide, via the social networking system, an account overview of the gift account to the recipient, wherein the account overview comprises monetary values redeemable through multiple merchants.

16. The system recited in claim 12, further comprising instructions that, when executed by the at least one processor, cause the system to:

receive an indication of a second purchase with the tangible gift card from a second point of sale system that is not a part of the social networking system, the second point of sale system associated with the second merchant; and based on receiving the indication of the second purchase from the second point of sale system associated with the second merchant with the tangible gift card, publish a detail of the second purchase to the feed within the social networking system.

17. The system recited in claim 12, further comprising instructions that, when executed by the at least one processor, cause the system to, in response to a determination that the merchant associated with the first point of sale system is not associated with a monetary value linked to the gift account, send a notification of the first purchase to the recipient.

18. The system recited in claim 12, further comprising instructions that, when executed by the at least one processor, cause the system to, in response to a determination that the merchant associated with the first point of sale system is not associated with a monetary value linked to the gift account, dissociate the tangible gift card from the gift account.

19. The method recited in claim 1, further comprising:

receiving an indication of a second purchase with the tangible gift card from a second point of sale system that is not a part of the social networking system, the second point of sale system associated with the second merchant; and based on receiving the indication of the second purchase from the second point of sale system associated with the second merchant with the tangible gift card, publish a detail of the second purchase to the feed within the social networking system.

20. The method recited in claim 1, further comprising in response to a determination that the merchant associated with the first point of sale system is not associated with a monetary value linked to the gift account, sending a notification of the first purchase to the recipient.

21. The method recited in claim 1, further comprising in response to a determination that the merchant associated with the first point of sale system is not associated with a monetary value linked to the gift account, dissociating the tangible gift card from the gift account.

22. A non-transitory computer readable medium comprising instructions thereon that, when executed by at least one processor, cause a computing device to perform steps comprising:

receiving a first gift order from a first sender through a social networking system, the first gift order specifying a recipient, a first merchant, and a first monetary value redeemable through the first merchant;

linking the first monetary value to a gift account;

receiving a second gift order from a second sender through the social networking system, the second gift order specifying the recipient, a second merchant, and a second monetary value redeemable through the second merchant;

linking the second monetary value to the gift account;

issuing a tangible gift card to the recipient, the tangible gift card linked to the gift account, of the recipient, within the social networking system, wherein the tangible gift card does not visually identify the first merchant or the second merchant;

receiving an indication of a first purchase with the tangible gift card from a first point of sale system that is not a part of the social networking system;

in response to receiving the indication of the first purchase with the tangible gift card from the first point of sale system, determining whether a merchant associated with the first point of sale system is associated with a monetary value linked to the gift account;

if the merchant associated with the first point of sale system is associated with a monetary value linked to the gift account, publishing a detail of the first purchase to a feed within the social networking system in accordance with a privacy setting of the recipient; and if the merchant associated with the first point of sale system is not associated with a monetary value linked to the gift account, flagging the indication of the first purchase as fraudulent.

* * * * *